United States Patent
Wall et al.

(10) Patent No.: US 11,494,825 B2
(45) Date of Patent: Nov. 8, 2022

(54) SYSTEM AND METHOD FOR ATTRIBUTING A PURCHASE TO A USER BY USER DEVICE LOCATION

(71) Applicant: RAIN-CHECK.IT PTY LTD

(72) Inventors: Cameron Wall, Sydney (AU); Wei Lin, Sydney (AU)

(73) Assignee: RAIN-CHECK.IT PTY LTD, Sydney (AU)

(*) Notice: Subject to any disclaimer, the term of this patent is extended or adjusted under 35 U.S.C. 154(b) by 482 days.

(21) Appl. No.: 16/060,824

(22) PCT Filed: Dec. 12, 2016

(86) PCT No.: PCT/AU2016/051223
§ 371 (c)(1),
(2) Date: Jun. 8, 2018

(87) PCT Pub. No.: WO2017/096437
PCT Pub. Date: Jun. 15, 2017

(65) Prior Publication Data
US 2018/0365754 A1    Dec. 20, 2018

(30) Foreign Application Priority Data
Dec. 11, 2015 (AU) ............................... 2015905145

(51) Int. Cl.
*G06Q 30/06* (2012.01)
*G06Q 20/32* (2012.01)
(Continued)

(52) U.S. Cl.
CPC ......... *G06Q 30/0633* (2013.01); *G06Q 10/08* (2013.01); *G06Q 10/0875* (2013.01);
(Continued)

(58) Field of Classification Search
CPC .............. G06Q 10/08; G06Q 10/0875; G06Q 20/3221; G06Q 30/06–0645; G06Q 30/08; G06Q 50/01
See application file for complete search history.

(56) References Cited

U.S. PATENT DOCUMENTS 7,069,238 B2 * 6/2006 I'Anson ................. G06Q 30/06
705/26.64
7,797,204 B2 * 9/2010 Balent ................. G06Q 30/0633
705/28
(Continued)

FOREIGN PATENT DOCUMENTS

CN    10 38 43 02 7 A    6/2014
WO    2014160857    10/2014

OTHER PUBLICATIONS

PCT International Search Report No. PCT/AU2016/051223, dated Mar. 20, 2017.
Apr. 30, 2021 Chinese official action (and machine translation thereof into English) in corresponding Chinese Patent Application No. 201680081662.3.

*Primary Examiner* — Adam L Levine
(74) *Attorney, Agent, or Firm* — Conley Rose, P. C.; Gayatry S. Nair

(57) ABSTRACT

A system for facilitating the postponed purchase of an item is described. The system comprises: a networked matching engine for matching stock identifier information relating to one or more items for postponed purchase by a user, with information relating to the availability of the one or more items in a physical store; a location engine for locating a mobile device in a physical location relative to the physical store; and a notification engine in communication with the networked matching engine and the location engine, the notification engine configured to receive matches of stock identifier information and then notify the user via the user mobile device regarding the availability of the one or more items when the mobile device is disposed at a selected (Continued)

distance from a physical store which has items within it which correspond to the matched stock identifier information. There is also described a method of facilitating a postponed purchase of an item to a user. The method includes the steps of: receiving at least one data set relating to an item for sale into a networked computer processing device; representing at least one of the data sets on a display of the networked computer processing device; assessing a distance between a physical item for sale associated with the at least one data sets and the networked computer processing device; notifying the user via the networked computer processing device of the distance to the physical item.

20 Claims, 20 Drawing Sheets

(51) Int. Cl.
  *G06Q 10/08* (2012.01)
  *G06Q 50/00* (2012.01)
(52) U.S. Cl.
  CPC ..... *G06Q 20/3221* (2013.01); *G06Q 30/0601* (2013.01); *G06Q 30/0641* (2013.01); *G06Q 50/01* (2013.01)

(56) References Cited

U.S. PATENT DOCUMENTS

| | | | |
|---|---|---|---|
| 8,200,551 B1 | 6/2012 | Nemer | |
| 8,335,723 B2* | 12/2012 | Tedesco | G06Q 30/0643 705/26.1 |
| 10,068,272 B1* | 9/2018 | Varma | G06Q 30/0633 |
| 2002/0062263 A1 | 5/2002 | Katou | |
| 2008/0168270 A1* | 7/2008 | Kulakowski | H04L 9/3271 713/168 |
| 2008/0235108 A1* | 9/2008 | Kulakowski | G06Q 10/025 705/5 |
| 2010/0030624 A1 | 2/2010 | Vanska et al. | |
| 2010/0306080 A1* | 12/2010 | Trandal | G06Q 10/10 705/26.8 |
| 2011/0320318 A1 | 12/2011 | Patel et al. | |
| 2012/0010998 A1 | 1/2012 | Spreen et al. | |
| 2012/0316938 A1* | 12/2012 | Moshfeghi | G06Q 30/02 705/14.16 |
| 2013/0073432 A1* | 3/2013 | Mulholland | G06Q 20/12 705/26.61 |
| 2014/0304111 A1 | 10/2014 | Besore et al. | |
| 2015/0324891 A1 | 11/2015 | Tapley et al. | |
| 2022/0270107 A1* | 8/2022 | MacKinnon | G06Q 20/385 |

* cited by examiner

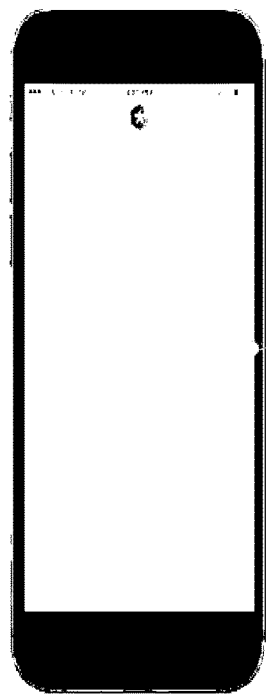
015
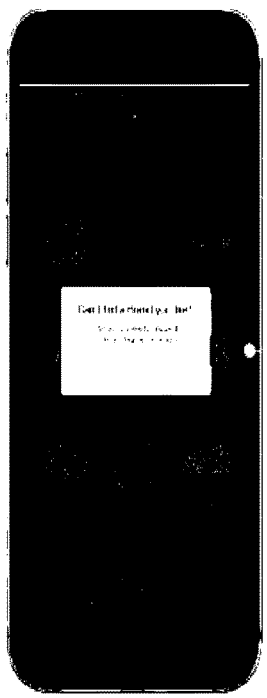
023
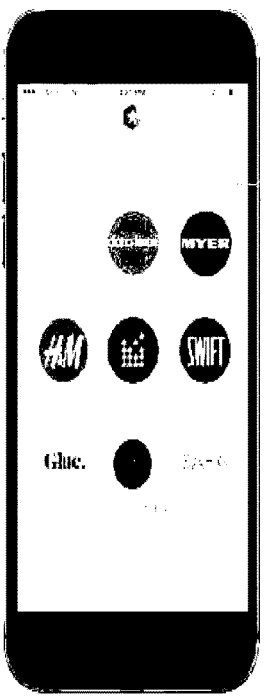
024
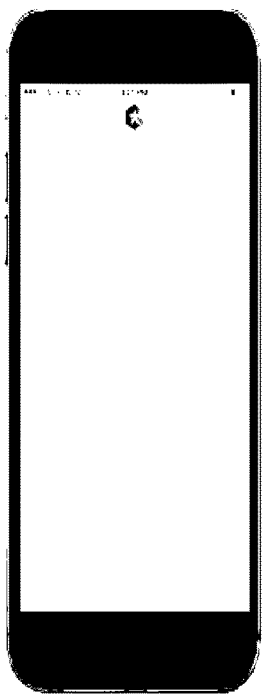
025
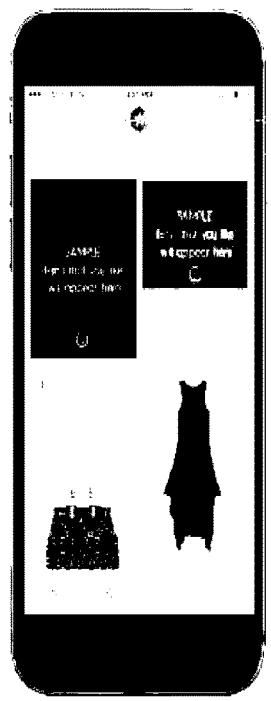
014
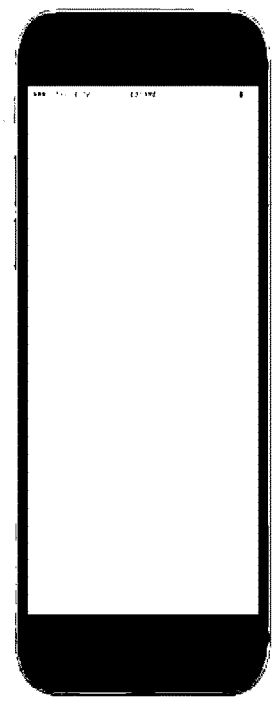
026

SYSTEM AND METHOD FOR ATTRIBUTING A PURCHASE TO A USER BY USER DEVICE LOCATION

CROSS REFERENCE TO PRIOR APPLICATIONS

This application is a § 371 national stage of PCT International Application No. PCT/AU2016/051223, filed on Dec. 12, 2016, and which claims priority to Australian Patent Application AU2015905145, filed on Dec. 11, 2015. The contents of both applications are hereby incorporated by reference in their entireties.

TECHNICAL FIELD

The present technology relates generally to a system and method of facilitating shopping.

BACKGROUND

Browsing online for items offered for sale is a popular pastime. There are myriad options for online purchase but for various reasons many people tend to buy offline.

For example, people like to touch and feel an item before they buy. People like to try an item on to check for any quality or build issues, sizing peculiarities, weight, or for larger items, to walk around it and view it from various angles for clearer visualisation.

For these reasons and more, market penetration of online purchases has not been as deep at this time as some analysts had predicted. On E-commerce websites, shopping cart abandonment rates are high, averaging approximately 75% across all retail sectors. E-commerce, according to some analysts, has only been growing at approximately 2.8% per annum in the years 2010-2015.

People also enjoy browsing for items in glossy brochures, lifestyle magazines and in the bricks-and-mortar stores themselves; pastimes which themselves can be their own reward. Even in a bricks-and-mortar (an offline) store, even when touching the item and trying it on, many shoppers may have no intention to buy at that time; instead, they enjoy ruminating on the decision and perhaps having an intention to return at a later time to purchase the item.

Often it is the sighting of a billboard or outdoor advertising panel that piques the interest of a person at least to investigate a buying opportunity for a product, and to at least partially take a journey to actual purchase of that product. That might draw the person to seek further information via a website or app on an electronic device but that person still may have no intention to buy at that time.

The present technology seeks to provide a new method of facilitating shopping, as well as in the alternative or in addition, devices for and systems for facilitating shopping.

SUMMARY

Broadly, the present technology provides a method of facilitating shopping wherein a system ascertains the physical location of inventory items (which are in stock at a physical or offline store) which correspond to those items set out on a user's online shopping wish list.

In some embodiments, the system and method alerts the user to the availability of those items for purchase when the user is near the physical or offline store which contains the item.

Broadly, the present technology provides a system and a method which facilitates an online, in-app or in-store purchase of an item from a vendor.

Broadly, the present technology provides a system and a method which facilitates attribution of a purchased item to a user of the present system and method whether there is an online, in-app or in-store purchase of the item. That is, broadly, there is a tracking system of payments back to a user of the present technology even in the case of an offline purchase.

Broadly, the present technology provides a system and a method which stores metadata relating to postponed purchases in a user list in a networked database and matches that listed metadata with available physical stock data in an offline store.

Broadly, the present technology adds a location layer of data to SKU data available from a vendor relating to items that the vendor has for sale in one or more of their physical or offline shops, and presents that location layer of data to a mobile computer processing device of a user for processing. In one embodiment the location layer of data is added to SKU data on a user's wish list stored on the mobile computer processing device. In one embodiment the location data is processed by comparing the location data to the present location of the user's mobile computer processing device.

In some embodiments the metadata and the physical stock data is matched in real time, as is location data of a networked user mobile device so that the relative location of the offline store and the networked user mobile device can be monitored and linked to the matched metadata.

In another broad aspect the technology provides a system and a method for purchasing an item in an online or offline store after the purchase of the item has been foreshadowed but postponed online.

In accordance with one aspect of the present technology there is provided a system for facilitating the postponed purchase of an item, the system including:

a networked matching engine for matching stock identifier information relating to one or more items for postponed purchase by a user, with information relating to the location of the one or more items in a physical store;

a networked location engine for locating a user mobile device in a physical location relative to the physical store.

In some embodiments a notification engine is provided, which is in communication with the networked matching engine and the location engine, the notification engine being configured to receive matches of stock identifier information from the networked matching engine and then notify the user via the user mobile device regarding the availability of the one or more items when the mobile device is disposed at a selected distance from a physical store which has items within it available for sale which correspond to the matched stock identifier information.

In accordance with another aspect of the present technology there is provided a method of facilitating a postponed purchase of an item to a user, the method including the steps of:

receiving at least one data set relating to an item for sale into a networked computer processing device;

representing at least one of the data sets on a display of the networked computer processing device;

assessing a distance between a physical item for sale associated with the at least one data sets and the networked computer processing device;

notifying the user via the networked computer processing device of the distance to the physical item.

In one embodiment the networked computer processing device is a mobile computer processing device.

In one embodiment the data item is an SKU (Stock Keeping Unit) data item and includes image data, price data, colour data, size data, category data and the like.

In accordance with another aspect of the present technology there is provided a method of facilitating a postponed purchase of a vendor's item to a user, the method including the steps of:

receiving at least one data item set regarding the vendor's item from computer processing system of the vendor into a mobile computer processing device of the user;

displaying at least one of the data items on a display of the mobile computer processing device;

assessing a distance between a physical item associated with the at least one data item sets and the mobile computer processing device;

transferring a purchase amount of funds from a bank account of the user to the vendor of the item.

In one embodiment the method includes the step of requesting delivery of the item to the user.

In one embodiment the delivery request step includes sending the location of the mobile computer processing device to the vendor for delivery thereto. In one embodiment the location of the mobile computer processing device is a home or work location of the mobile computer processing device.

In one embodiment, the method includes representation of a plurality of the data sets on a display for a user to browse in a known manner on the screen of the mobile computer processing device.

In embodiments, the method includes the step of storing a plurality of represented items, selected by the user, on a raincheck or wish list in the mobile computer processing device.

In embodiments the method includes the step of creating a user account for the user on the mobile computer processing device.

In embodiments the method includes the step of recording one or more bank account details for the user and associating them with the user account.

In embodiments the method includes the step of recording a notification made to the mobile computer processing device regarding the item and checking purchases of the item made during a subsequent time period.

In embodiments the method includes the step of billing the vendor a selected amount if the checking step identifies a likely purchase by the user.

In embodiments the billing step is also taken if the checking step identifies an actual purchase made by the user using the user's bank account details.

In accordance with one aspect of the present technology there is provided a method of facilitating the postponed purchase of an item for sale on a vendor website, the method including the step of providing a raincheck button on a vendor website page for displaying an item for sale by the vendor, the raincheck button being configured to call a computer-facilitated method which:

transmits the data set relating to the displayed item for sale into a mobile computer processing device;

stores the data set on the mobile computer processing device in a raincheck or wish list.

In embodiments the method includes the step of representing the data set on a display of the mobile computer processing device.

In embodiments the method includes the step of providing payment options on the display of the mobile computer processing device.

In accordance with a first aspect of the present technology there is provided a method of facilitating a postponed purchase of an item to a user, the method including the steps of:

creating a user account on a network computer processing agent;

receiving into the network computer processing agent, one or more stock identifiers relating to a postponed sale to the user;

associating, in the network computer processing agent, the one or more stock identifiers with the user account;

receiving, in the network computer processing agent, information relating to the physical location of a mobile user network device associated with the account;

requesting with the network computer processing agent, from a merchant network computer processing system, physical location and availability information on the items corresponding to the stock identifiers, in one or more physical stores of the merchant;

generating a notification message and transmitting to the mobile user network device, by the user network computer processing agent, regarding the availability of one or more items in one or more of the physical stores of the merchant, the message being dependent on a selected distance between the physical store and the mobile user network device associated with the user account.

In accordance with another aspect of the present technology there is provided a networked server system for facilitating the postponed purchase of an item, the networked server system including:

a storage resource;

a processor communicatively coupled to the storage resource, wherein the processor executes application code instructions that are stored in the storage resource and that cause the system to:

create a user account on a network computer processing agent;

receive into the network computer processing agent, from a user computer processing system, one or more stock identifiers relating to a postponed sale;

associate, in the network computer processing agent, the one or more stock identifiers with the user account;

receive information relating to the physical location of a mobile user network device associated with the account;

request with the network computer processing agent, from a merchant network computer processing system, physical location and availability information on the items corresponding to the stock identifiers, in one or more physical stores of the merchant;

generate a notification message and transmitting to the mobile user network device, by the user network computer processing agent, regarding the availability of one or more items in one or more of the physical stores of the merchant, the message being dependent on a selected distance between the physical store and the mobile user network device associated with the user account.

In accordance with still another aspect of the present technology there is provided a computer program product, comprising a non-transitory computer-readable medium comprising computer-executable instructions for facilitating the purchase of a postponed item, the instructions comprising:

computer-executable program instructions to create a user account on a network computer processing agent;

computer-executable program instructions to receive into the network computer processing agent, from a user computer processing system, one or more stock identifiers relating to a postponed sale;

computer-executable program instructions to associate, in the network computer processing agent, the one or more stock identifiers with the user account;

computer-executable program instructions to receive information relating to the physical location of a mobile user network device associated with the account;

computer-executable program instructions to request with the network computer processing agent, from a merchant network computer processing system, physical location and availability information on the items corresponding to the stock identifiers, in one or more physical stores of the merchant;

computer-executable program instructions to generate a notification message and transmitting to the mobile user network device, by the user network computer processing agent, regarding the availability of one or more items in one or more of the physical stores of the merchant, the message being dependent on a selected distance between the physical store and the mobile user network device associated with the user account.

In accordance with an even further aspect of the present technology there is provided a method of facilitating a postponed purchase of an item, the method including the steps of:

creating a user account on a user network computer processing device; sending to a network computer processing agent, from the user network computer processing device, one or more stock identifiers relating to a postponed sale, together with user account information;

determining a location of the user network computer processing device; requesting with the network computer processing agent, from a merchant network computer processing system, physical location and availability information on the items corresponding to the stock identifiers, in one or more physical stores of the merchant;

receiving a notification message in the user network computer processing device, and displaying the notification message on the user network computer processing device, regarding the availability of one or more items in one or more of the physical stores of the merchant, the message being dependent on a selected distance between the physical store and the mobile user network device associated with the user account.

In accordance with a yet further aspect of the present technology there is provided a networked user computer processing system for facilitating the postponed purchase of an item, the networked server system including:

a storage resource;

a processor communicatively coupled to the storage resource, wherein the processor executes application code instructions that are stored in the storage resource and that cause the system to:

create a user account on a user network computer processing device; send to a network computer processing agent, from the user network computer processing device, one or more stock identifiers relating to a postponed sale, together with user account information;

determine a location of the user network computer processing device; request with the network computer processing agent, from a merchant network computer processing system, physical location and availability information on the items corresponding to the stock identifiers, in one or more physical stores of the merchant;

receive a notification message in the user network computer processing device, and display the notification message on the user network computer processing device, regarding the availability of one or more items in one or more of the physical stores of the merchant, the message being dependent on a selected distance between the physical store and the mobile user network device associated with the user account.

In accordance with still another aspect of the present technology there is provided a computer program product, comprising a non-transitory computer-readable medium comprising computer-executable instructions for facilitating the purchase of a postponed item, the computer-executable instructions comprising:

computer-executable program instructions to create a user account on a user network computer processing device;

computer-executable program instructions to send to a network computer processing agent, from the user network computer processing device, one or more stock identifiers relating to a postponed sale, together with user account information;

computer-executable program instructions to determine a location of the user network computer processing device;

computer-executable program instructions to request with the network computer processing agent, from a merchant network computer processing system, physical location and availability information on the items corresponding to the stock identifiers, in one or more physical stores of the merchant;

computer-executable program instructions to receive a notification message in the user network computer processing device, and display the notification message on the user network computer processing device, regarding the availability of one or more items in one or more of the physical stores of the merchant, the message being dependent on a selected distance between the physical store and the mobile user network device associated with the user account.

In one embodiment the receiving step relating to stock identifiers may include steps such as for example;

receiving stock identifier data from networked billboards operating with selected network protocols;

receiving optical codes set out on a billboard or selected page of a magazine using a code reader such as a camera with appropriate image processing software;

taking a photograph of an item on a billboard with a networked camera device;

scanning a unidimensional or two-dimensional barcode with a scanning device disposed on a swing tag of an item;

directly from a mobile user network device using a wireless network protocol;

directly using a user network computer system (desktop);

wirelessly from the merchant network computer processing system; wirelessly from a beacon disposed in the merchant store;

by actuating a portion of a screen area relating an online advertisement (which may call an API which stores stock identifier data on the user mobile device or on the networked computer processing agent;

by touching a button on a touch screen which is displaying a RainCheck button which is an actuation area on a screen which in use calls an API to store and upload metadata to the networked computer processing agent for matching;

tapping a mobile user network device on a reader or connected print, using RFID/NFC/Bluetooth protocols;

swiping an area on the display screen of the mobile user network device.

In some embodiments, the stock identifiers may include SKU (Stock Keeping Unit) data, image data, price data, colour data, size data, category data and the like.

In one embodiment the receiving step relating to receiving information relating to the location of the mobile user network device into the network computer processing agent may occur via a network device associated with the network computer processing agent which is configured to receive information via one or more various sources, including: a GPS device on the mobile user network device; a beacon in merchant physical store; a cellphone tower using a GSM protocol or a GPRS protocol; AMPS; UMTS; LTE; LTE Advanced; Mobile WiMax; WiMax Advanced; Wifi router or any combination of the above.

In some embodiments, the step of requesting physical location of the items corresponding to the stock identifiers may be undertaken by a network device associated with the network computer processing agent.

In one embodiment the method includes the step of displaying on a screen of a user network computer processing system, the one or more identifiers of the items available for sale in one or more of the physical stores of the merchant.

In one embodiment the method includes the step of receiving, by a user network computer processing system, a user selection of identifiers of items. The user selection of identifiers of items forms an online shopping list of items for postponed purchase.

In one embodiment the method includes the step of receiving, into a user network computer processing system, from an input device, the user selection of identifiers of items. In one embodiment the method includes the step of receiving from a touch screen, mouse, keyboard, microphone, accelerometer input, stylus or other suitable input device.

In one embodiment the displaying step includes displaying one or more tiles on the display screen. In one embodiment the method includes the step of receiving into a user network computer processing system notification of a haptic event on a touch screen.

In one embodiment the message generation step further includes calculating a route to the offline store from the physical location of the user network computer processing system.

In one embodiment the message generation step includes generating a written message on a display screen, or generating an audible message through a loudspeaker electrically connected to the user network computer processing system, or a vibration message such as in Morse or other code.

In this specification, where a document, act or item of knowledge is referred to or discussed, this reference or discussion is not an admission that the document, act or item of knowledge or any combination thereof was at the priority date:
   part of common general knowledge; or
   known to be relevant to an attempt to solve any problem with which this specification is concerned.

It is to be noted that, throughout the description and claims of this specification, the word 'comprise' and variations of the word, such as 'comprising' and 'comprises', is not intended to exclude other variants or additional components, integers or steps.

BRIEF DESCRIPTION OF THE DRAWINGS

In order to enable a clearer understanding, a preferred embodiment of the technology will now be further explained and illustrated by reference to the accompanying drawings, in which:

FIG. 13 is a series of screen shots of a user journey showing the way the present technology might facilitate a user to shop and browse items, setting them aside on a digital list and stored on the device or in a cloud server for potential postponed purchase at a later date;

DETAILED DESCRIPTION OF AN EXAMPLE EMBODIMENT

Network and System Architecture

Figure 1:
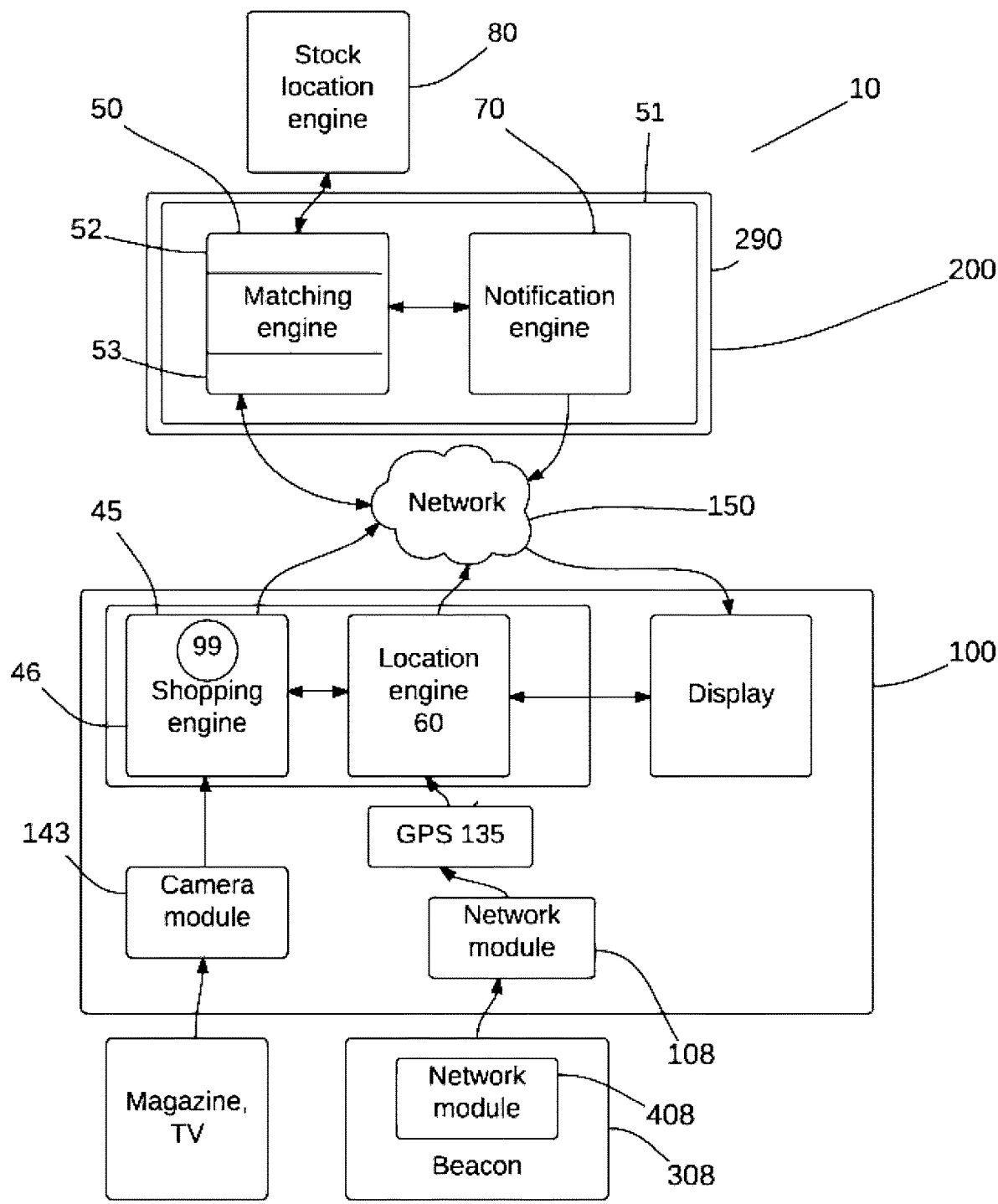
FIG. 1 is a schematic view of a system which can implement the technology and methods described herein.
Figure 6:
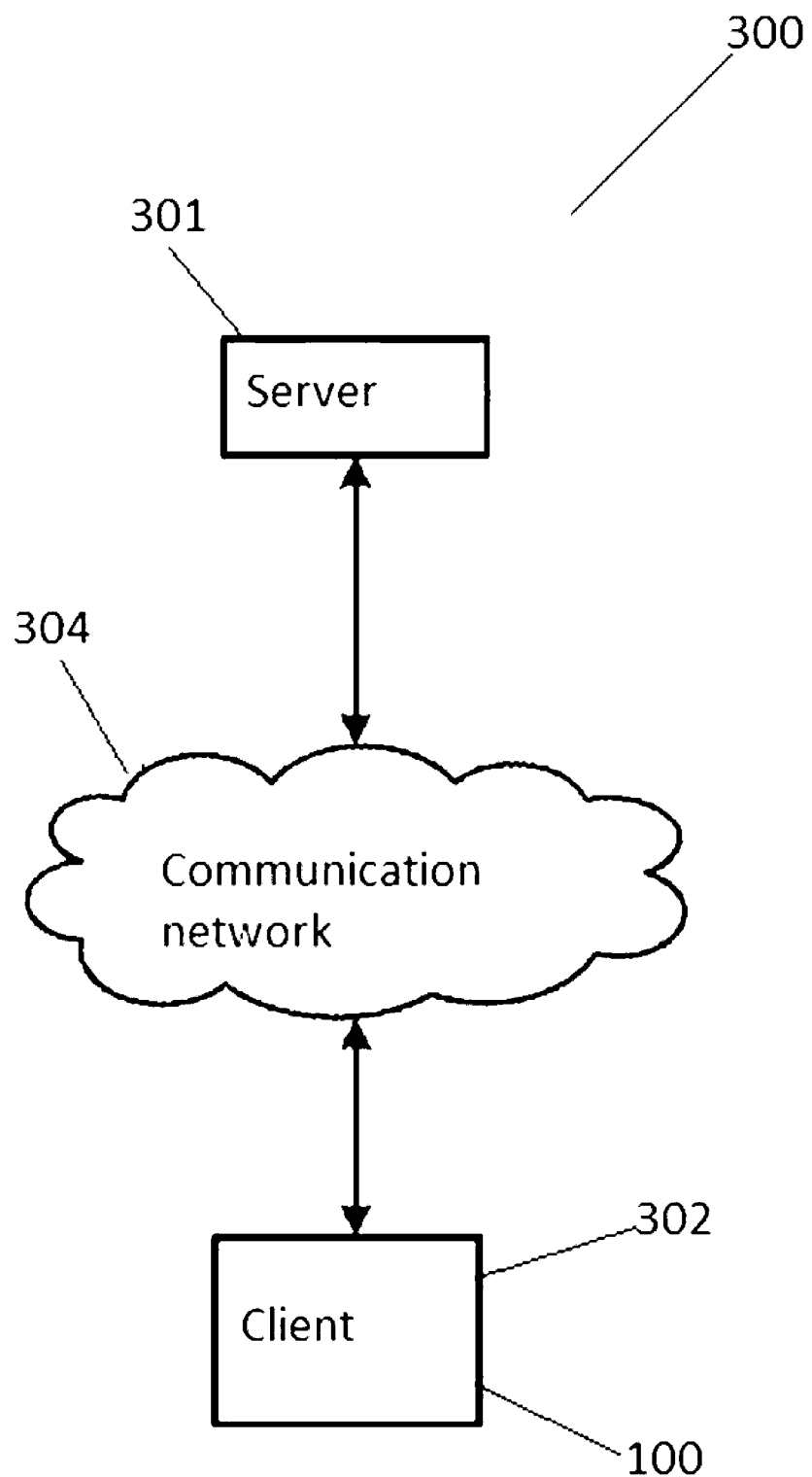
FIG. 6 is a schematic view of a generalised network architecture.
Figure 7:
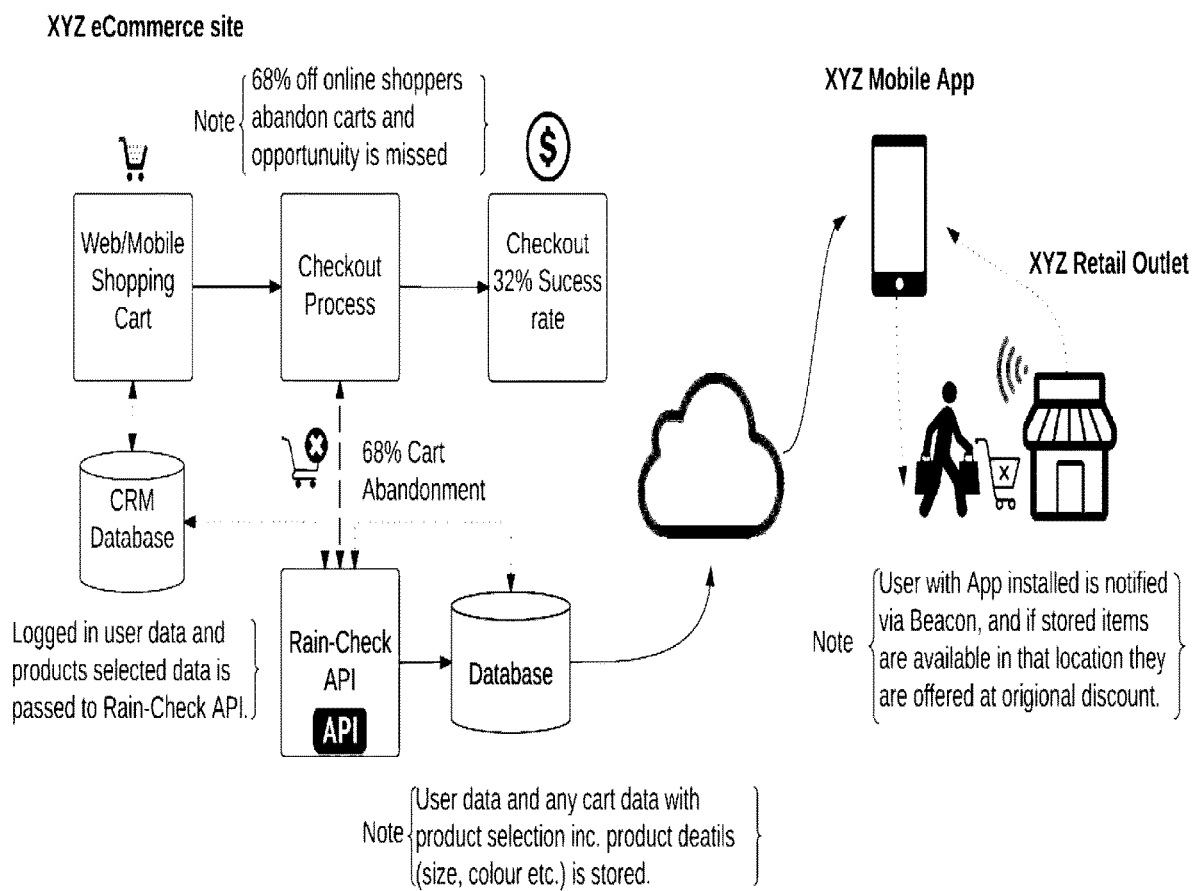
FIG. 7 is a schematic view of an embodiment of the present technology relating to in-store purchases from online browsing to offline purchase.

Referring to FIGS. 1 and 6 there is shown a system-wide network architecture which forms certain embodiments of the technology and which can implement other embodiments of the technology.

Referring to FIG. 6, an embodiment of a network environment is depicted. In brief overview, the network environment includes one or more client devices 100, 302 (also which may be referred to as local machine(s), client(s), client node(s), client machine(s), client computer(s), client device(s), endpoint(s), or endpoint node(s)) in communication with one or more servers 301 (also which may be referred to as server(s), nodes, or remote machine(s)) via one or more networks 304. In some embodiments, one client device 302 has the capacity to function as both a client node seeking access to resources provided by a server and as a server providing access to hosted resources for other client devices 302 (where there may be more than one client device).

Figure 11:
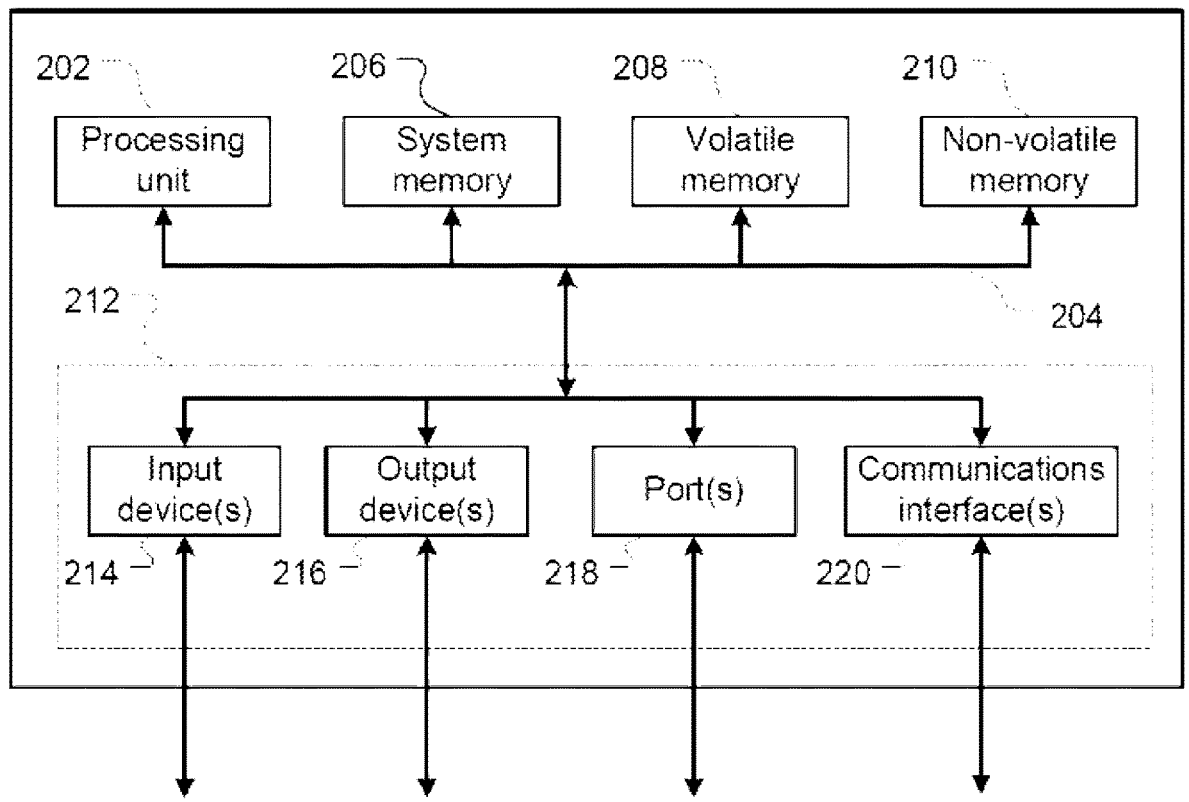
FIG. 11 is a schematic view of a generalised networked server used in certain embodiments of the present technology as a networked computer processing agent facilitating the purchase of postponed items.
Figure 12:
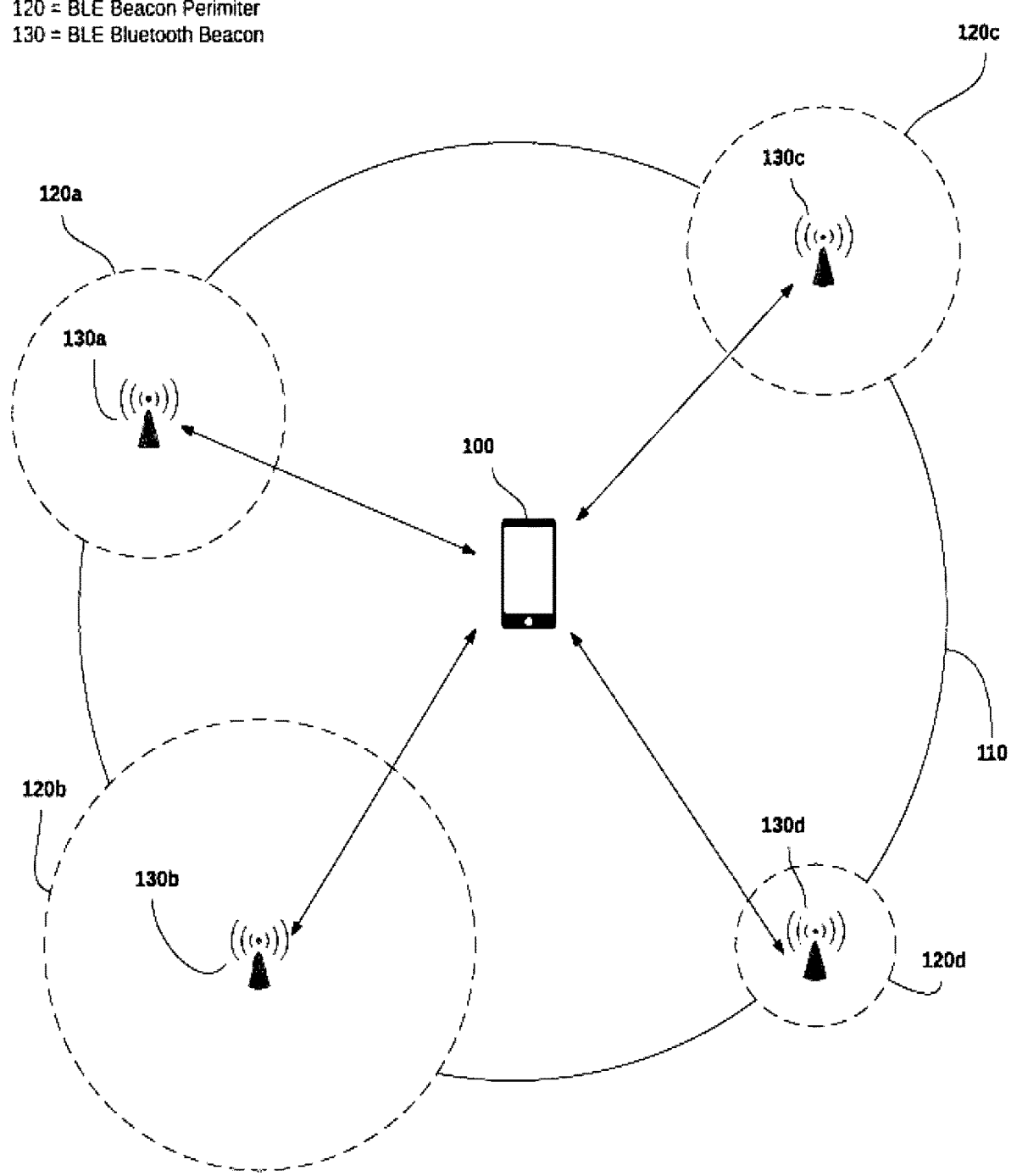
FIG. 12 is a schematic view of geo-fencing utilised in certain embodiments of the present technology to locate a user networked mobile device.
Figure 14:
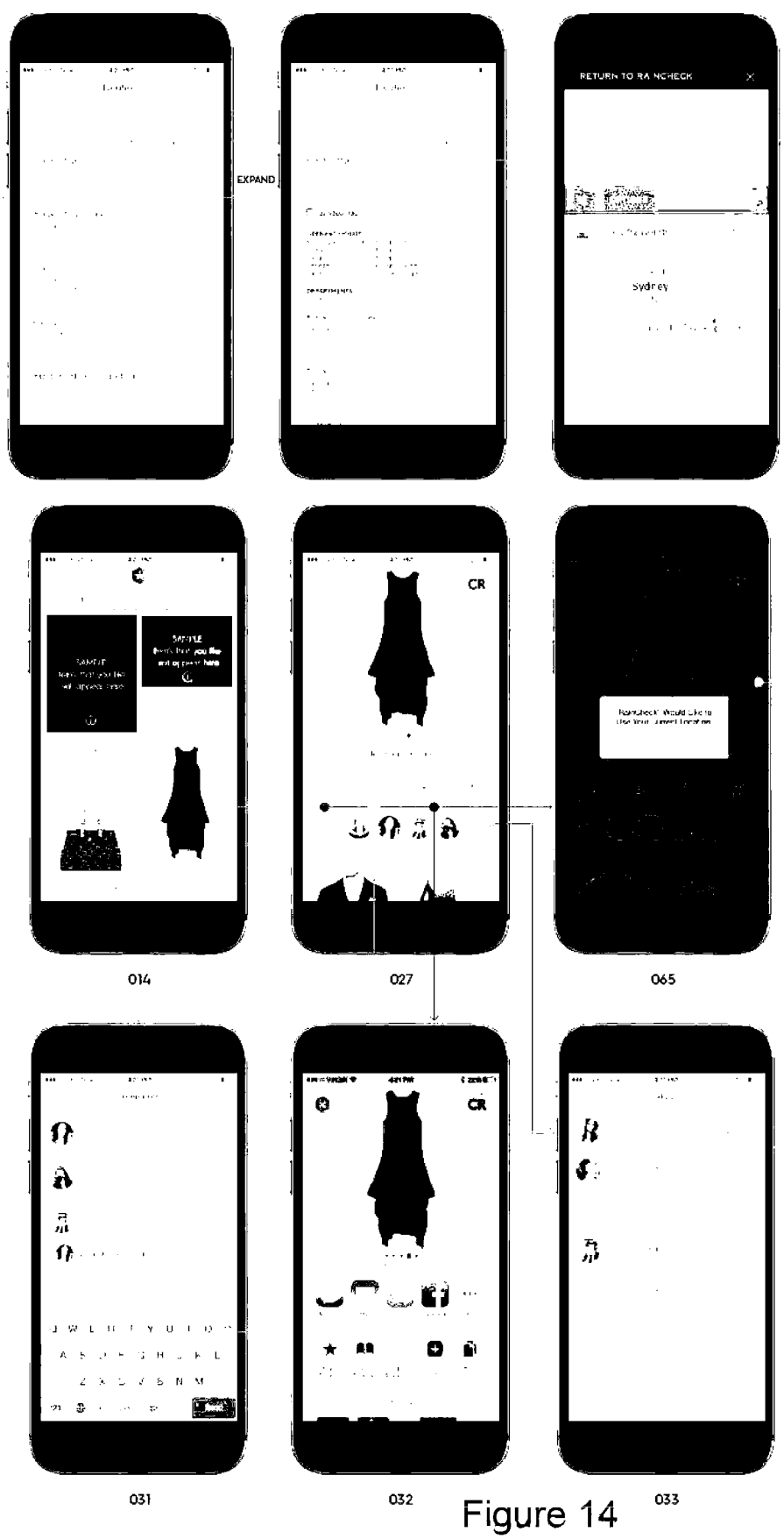
FIG. 14 is a series of screen shots of a user journey on a user networked mobile device using the present technology showing location of items postponed for later purchase, the screen shots caused to be displayed on a user mobile device to facilitate the later purchase of the item and the technology showing a distance to the nearest physical one of the reserved or postponed items, and calling a map API to generate and show a route to that item.

Referring to FIG. 1 again, a networked server 200 is shown, known as the Raincheck server 201. The networked server 200 is configured to facilitate the postponed purchase of an item and can be any particular kind of computer processing system although an example networked server 200 is shown in FIG. 11. Although FIG. 11 depicts various features and components for convenience and clearer understanding of the structure and implementation of the invention, it will be appreciated that alternative computer systems suitable for implementing aspects of the invention may have additional, alternative, or fewer components.

The networked server 200 may be a computing system and may be accessible via another network and may therefore be a server or a cloud server or other processor hardware and may include any particular processor including a desktop, laptop, notebook, netbook, tablet computer, mobile phone, PDA although any one of those may be less desirable than another and may be more suitable to being a client. In any event a suitable networked server 200 may be computing systems having components similar to system 200. As will be appreciated, the particular type of computing system will determine the appropriate hardware and architecture. For example there may be various client nodes working to access the additional computing power of a server.

The networked server 200 includes at least one processing unit 202. The processing unit 202 may include a single processor (e.g. a microprocessor or other computational device), or may include a plurality of processors. In some instances all processing or determining steps will be performed by processing unit 202, however in other instances processing or determining steps may also, or alternatively, be performed by remote processors accessible and useable (either in a shared or dedicated manner) by the server 200.

Through a communications bus 204 the processing unit 202 is in data communication with a system memory 206 (e.g. a BIOS), volatile memory 208 (e.g. random access memory including one or more DRAM modules), and non-volatile memory 210 (e.g. one or more hard disk drives, solid state drives, and/or ROM devices such EPROMs). Instructions and data for controlling operation of the processing unit 202 are stored on the system, volatile, and/or nonvolatile memory 206, 208, and 210.

The networked server 200 also includes one or more input/output interfaces (indicated generally by 212) which interface with a plurality of input/output devices. As will be appreciated, a wide variety of input/output devices may be used, including intelligent input/output devices having their own memory and/or processing units. By way of non-limiting example, the server 200 may include: one or more user input devices 214 (e.g. keyboard, mouse, a touchscreen, trackpad, microphone, etc); one or more user output devices 216 (e.g. CRT display, LCD display, LED display, plasma display, touch screen, speaker, etc); one or more ports 218 for interfacing with external devices such as drives and memory (e.g. USB ports, Firewire ports, eSata ports, serial ports, parallel ports, SD card port, Compact Flash port, etc); and one or more communications interfaces 220 (e.g. a Network Interface Card allowing for wired or wireless connection to a communications network such as a local or wide area network). The networked server 200 will run one or more applications to allow a user to operate the system 200. Such applications will typically include at least an operating system (such as Microsoft Windows, Apple OSX, Apple IOS, Android, Unix, or Linux).

The network 150 may be an external network or the devices 200, 300, etc may be on the same network. The network 150 may connect the devices together via wired or wireless links. Wired links may include Digital Subscriber Line (DSL), coaxial cable lines, or optical fibre lines. The wireless links may include Bluetooth, WiFi, WiMax, infrared or satellite band, cellular network devices of any suitable standard including 1G, 2G, 3G or 4G. In detail, the 3G standards, for example, may correspond to the International Mobile Telecommunications-2000 (IMT-2000) specification, and the 4G standards may correspond to the International Mobile Telecommunications Advanced (IMT-Advanced) specification. Examples of cellular network standards include AMPS, GSM, GPRS, UMTS, LTE, LTE Advanced, Mobile WiMAX, and WiMAX-Advanced. Cellular network standards may use various channel access methods e.g. FDMA, TDMA, CDMA, or SDMA. Some embodiments may provide that different types of data transmitted via different links and standards. It is to be understood that other embodiments, may transmit the same kind of data via different links and standards.

The network 150 may be any type and/or form of network. The geographical scope of the network 150 may vary widely and the network 150 can be a body area network (BAN), a personal area network (PAN), a local-area network (LAN), e.g. Intranet, a metropolitan area network (MAN), a wide area network (WAN), or the Internet. The topology of the network 150 may be of any form and may include, e.g., any of the following: point-to-point, bus, star, ring, mesh, or tree. The network 150 may be an overlay network which is virtual and sits on top of one or more layers of other networks 150. The network 150 may be of any such network topology as known to those ordinarily skilled in the art capable of supporting the operations described herein. The network 150 may utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol. The TCP/IP internet protocol suite may include application layer, transport layer, internet layer (including, e.g., IPv6), or the link layer. The network 150 may be a type of a broadcast network, a telecommunications network, a data communication network, or a computer network.

In some embodiments, the networked system may include multiple, logically-grouped servers 301. In one of these embodiments, the logical group of servers may be referred to as a server farm or a machine farm. In another of these embodiments, the servers 301 may be geographically dispersed. In other embodiments, a machine farm may be administered as a single entity. In still other embodiments, the machine farm includes a plurality of machine farms. The servers 301 within each machine farm can be heterogeneous—one or more of the servers 301 or machines 301 can operate according to one type of operating system platform (e.g., WINDOWS NT), while one or more of the other servers 301 can operate according to another type of operating system platform (e.g., Unix, Linux, or Mac OS X).

In one embodiment, servers 301 in the machine farm may be stored in high-density rack systems, along with associated storage systems, and located in an enterprise data centre. In this embodiment, consolidating the servers 301 in this way may improve system manageability, data security, the physical security of the system, and system performance by locating servers 301 and high performance storage systems on localized high performance networks.

The servers 301 of each machine farm do not need to be physically proximate to another server 301 in the same machine farm. Thus, the group of servers 301 logically grouped as a machine farm may be interconnected using a wide-area network (WAN) connection or a metropolitan-area network (MAN) connection. For example, a machine farm may include servers 301 physically located in different continents or different regions of a continent, country, state, city, campus, or room. Data transmission speeds between servers 301 in the machine farm can be increased if the servers 301 are connected using a local-area network (LAN) connection or some form of direct connection. Additionally, a heterogeneous machine farm may include one or more servers 301 operating according to a type of operating system, while one or more other servers 301 execute one or more types of hypervisors rather than operating systems. In these embodiments, hypervisors may be used to emulate virtual hardware, partition physical hardware, virtualize physical hardware, and execute virtual machines that provide access to computing environments, allowing multiple operating systems to run concurrently on a host computer. Native hypervisors may run directly on the host computer. Hypervisors may include VMware ESX/ESXi, manufactured by VMWare, Inc, the Xen hypervisor, the HYPER-V hypervisors or others. Hosted hypervisors may run within an operating system on a second software level. Examples of hosted hypervisors may include VMware Workstation and VIRTUALBOX.

Management of the machine farm may be de-centralised. For example, one or more servers 301 may comprise components, subsystems and modules to support one or more management services for the machine farm. In one of these embodiments, one or more servers 301 provide functionality for management of dynamic data, including techniques for handling failover, data replication, and increasing the robustness of the machine farm. Each server 301 may communicate with a persistent store and, in some embodiments, with a dynamic store.

Server 301 may be a file server, application server, web server, proxy server, appliance, network appliance, gateway, gateway server, virtualisation server, deployment server, SSL VPN server, or firewall. In one embodiment, the server 301 may be referred to as a remote machine or a node. In another embodiment, a plurality of nodes may be in the path between any two communicating servers.

A cloud computing environment may be utilised to implement embodiments of the technology. A cloud computing environment may provide client device 302 with one or more resources provided by a network environment. The cloud computing environment may include one or more client devices 302, in communication with the cloud over one or more networks 150. Client devices 302 may include, e.g., thick clients, thin clients, and zero clients. A thick client may provide at least some functionality even when disconnected from the cloud or servers 301. A thin client or a zero client may depend on the connection to the cloud or server 301 to provide functionality. A zero client may depend on the cloud or other networks 150 or servers 301 to retrieve operating system data for the client device. The cloud may include back end platforms, e.g., servers 301, storage, server farms or data center.

The cloud may be public, private, or hybrid. Public clouds may include public servers 301 that are maintained by third parties to the client devices 302 or the owners of the clients. The servers 301 may be located off-site in remote geographical locations as disclosed above or otherwise. Public clouds may be connected to the servers 301 over a public network. Private clouds may include private servers 301 that are physically maintained by client devices 302 or owners of clients. Private clouds may be connected to the servers 301 over a private network 150. Hybrid clouds may include both the private and public networks 150 and servers 301.

The cloud may also include a cloud based delivery, e.g. Software as a Service (SaaS), Platform as a Service (PaaS), and Infrastructure as a Service (IaaS). IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Wash., RACKSPACE CLOUD provided by Rackspace US, Inc., of San Antonio, Tex., Google Compute Engine provided by Google Inc. of Mountain View, Calif., or RIGHTSCALE provided by RightScale, Inc., of Santa Barbara, Calif. PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Wash., Google App Engine provided by Google Inc., and HEROKU provided by Heroku, Inc. of San Francisco, Calif. SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, Calif., or OFFICE 365 provided by Microsoft Corporation. Examples of SaaS may also include data storage providers, e.g. DROPBOX provided by Dropbox, Inc. of San Francisco, Calif., Microsoft SKYDRIVE provided by Microsoft Corporation, Google Drive provided by Google Inc., or Apple ICLOUD provided by Apple Inc. of Cupertino, Calif.

Client devices 302 may access IaaS resources with one or more IaaS standards, including, e.g., Amazon Elastic Compute Cloud (EC2), Open Cloud Computing Interface (OCCI), Cloud Infrastructure Management Interface (CIMI), or OpenStack standards. Some IaaS standards may allow clients access to resources over HTTP, and may use Representational State Transfer (REST) protocol or Simple Object Access Protocol (SOAP). Client devices 302 may access PaaS resources with different PaaS interfaces.

Some PaaS interfaces use HTTP packages, standard Java APIs, JavaMail API, Java Data Objects (JDO), Java Persistence API (JPA), Python APIs, web integration APIs for different programming languages including, e.g., Rack for Ruby, WSGI for Python, or PSGI for Perl, or other APIs that may be built on REST, HTTP, XML, or other protocols. Client devices 302 may access SaaS resources through the use of web-based user interfaces, provided by a web browser (e.g. GOOGLE CHROME, Microsoft INTERNET EXPLORER, or Mozilla Firefox provided by Mozilla Foundation of Mountain View, Calif.). Client devices 302 may also access SaaS resources through smartphone or tablet applications, including, e.g., Salesforce Sales Cloud, or Google Drive app. Client devices 302 may also access SaaS resources through the client operating system, including, e.g., Windows file system for DROPBOX.

In some embodiments, access to IaaS, PaaS, or SaaS resources may be authenticated. For example, a server or authentication server may authenticate a user via security certificates, HTTPS, or API keys. API keys may include various encryption standards such as, e.g., Advanced Encryption Standard (AES). Data resources may be sent over Transport Layer Security (TLS) or Secure Sockets Layer (SSL).

Figure 4:
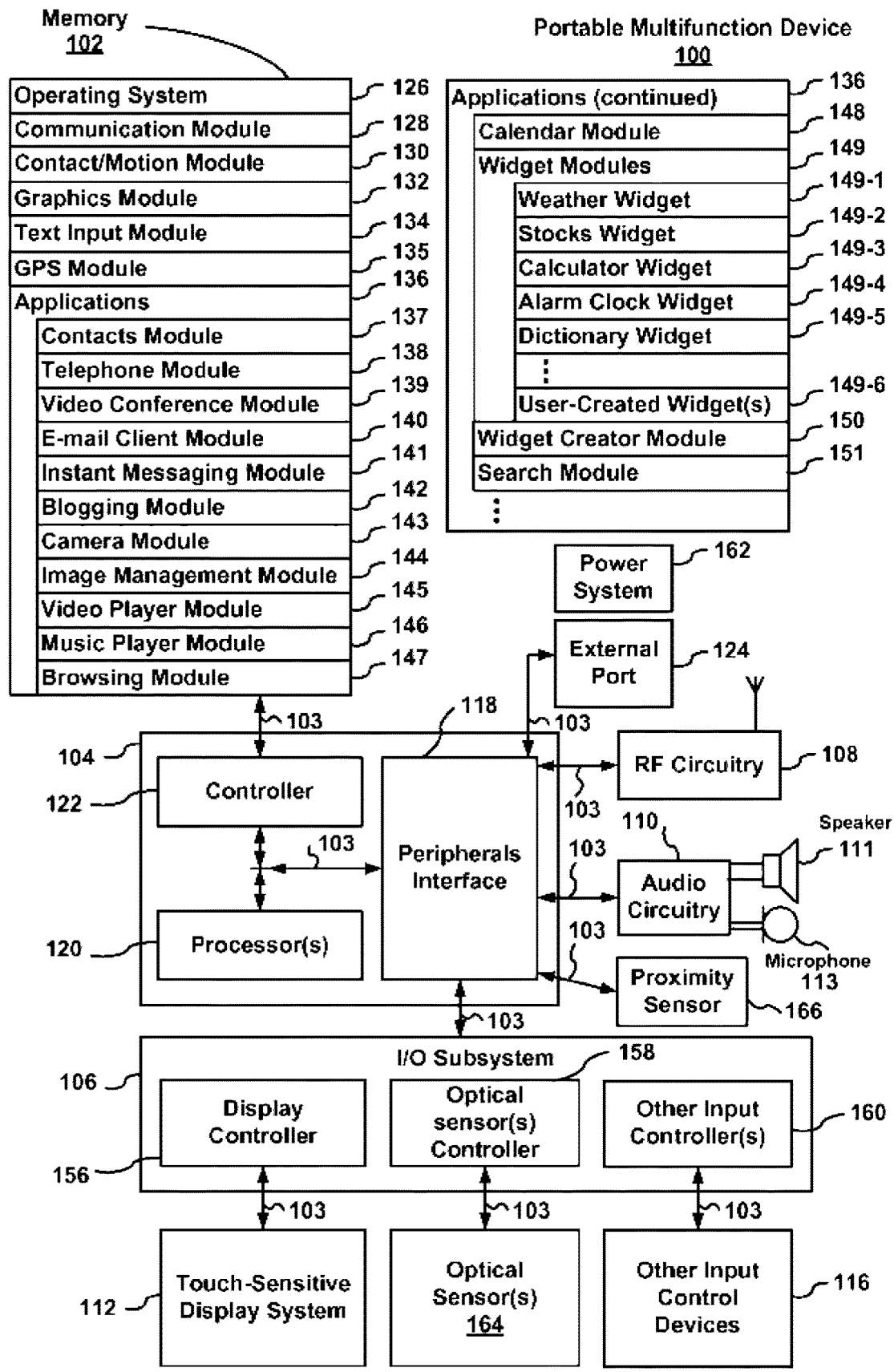
FIG. 4 is a schematic view of the architecture of a user mobile device on which an embodiment of the technology can be carried out.
Figure 5:
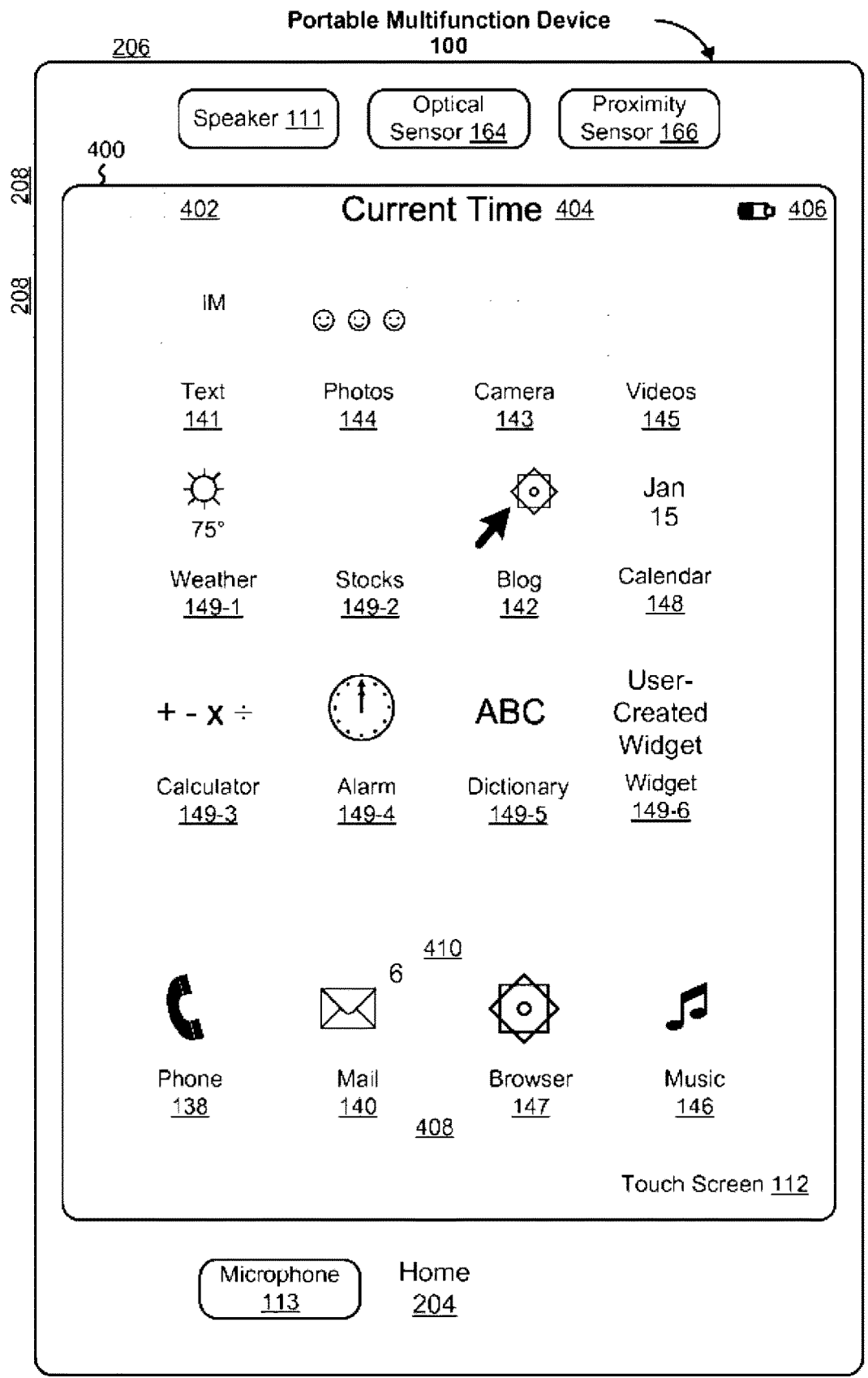
FIG. 5 is a schematic arrangement of the user mobile device shown in FIG. 4.

The client device 302 and server 301 may be deployed as and/or executed on any type and form of computing device, e.g. a computer, network device or appliance capable of communicating on any type and form of network and performing the operations described herein. FIGS. 4 and 5 depict diagrams of a computing device 100 useful for practicing an embodiment of the client device 302 or a server 301. Each computing device 100 is described below under the heading The portable electronic device.

System and Method for Facilitating a Postponed Purchase of an Item

Referring to the drawings there is shown a system 10 for facilitating the postponed purchase of an item. The system 10 includes a networked matching engine 50 for matching:

stock identifier information relating to one or more items for postponed purchase by a user, with information relating to the availability of the one or more items in a physical store.

The system 10 also includes a location engine 60 for sensing the location of a user mobile device 100 in a physical location relative to the physical store. The location engine 60 is in data communication with a network 150 so that it can transmit information relating to the location over the network 150.

Furthermore, the system 10 includes a notification engine 70 in data communication with the networked matching engine 50 and the location engine 60 (via the network 150), the notification engine 70 configured to receive the matches of stock identifier information from the networked matching engine 50 and then notify the user via the user mobile device 100 regarding the availability of the one or more items when the user mobile device 100 is disposed at a selected distance from a physical store which has items within it available for sale which correspond to the matched stock identifier information.

The networked server 200 includes a database and other storage and processing elements so that it is configured to form a network computer processing agent 290. The networked server 200 thus includes a processing unit 202 and a storage resource 206, 208 and/or 210, the processing unit 202 communicatively coupled to the storage resource 206, 208 and/or 210. The processing unit 202 is configured to execute application code instructions that are stored in the storage resource 206, 208 and/or 210 and that cause the networked server 200 to create a user account on the network computer processing agent 290.

The application code instructions also cause the processing unit 202 to allow the receiving into the network computer processing agent 290, from a user computer processing system 100, 302, of one or more stock identifiers relating to a postponed sale. Once the identifiers are received the application code instructions then associate, in the network computer processing agent 290, the one or more stock identifiers with the user account; and then cause the network computer processing agent 290 to receive information relating to the physical location of a mobile user network device 100, 302 (which may be the user computer processing system 100, 302) associated with the account; then they cause the network computer processing agent 290 to request from a merchant network computer processing system, physical location and availability information on the items corresponding to the stock identifiers in one or more physical stores of the merchant.

The application code instructions then cause the processing unit 202 to generate a notification message and transmit the message to the mobile user network device, by the user network computer processing agent, regarding the availability of one or more items in one or more of the physical stores of the merchant, the message being dependent on a selected distance between the physical store and the mobile user network device associated with the user account.

As can be seen in FIGS. 1 and 4, the GPS module 135 can provide the physical location of the user mobile device 100, although other suitable location-sensing modules or methods can be useful to utilise as fall back positions or in the alternative. In one embodiment a wireless beacon 308 provides a wireless connection via associated network modules 408 and 108 to the user mobile device 100. In that embodiment, the location engine 60 provides an assessment of the location of the beacon to a finer resolution than the GPS module 135, and even in cases where the GPS module 135 is not activated.

In one example embodiment, the selected distance may be anywhere from within the proximity zone of a beacon 308, or within any distance which is accessible by a car, boat, public transport or even plane. The location engine 60 may call a map API and the map API may then calculate a route and display it on the touch screen 112.

Beacon Architecture and Location Sensing

The beacon 308 includes a wireless module 408 and a power supply which may be a mains power supply or a battery (not shown). The wireless module 408 may be a WIFI radio, a Bluetooth radio, RFID tag and/or similar wireless transmitter or receiver. In some embodiments, the wireless module 408 is only a wireless transmitter (ie not a receiver/transceiver). For example, the beacon 308 may broadcast a signal that is detected by the user mobile device 100, but may not receive a signal from the user mobile device 100. The wireless module 408 may be a low power wireless module such as a Bluetooth 4.0 (i.e., low energy) radio. Additionally or alternatively, the wireless module 408 may cycle on and off to conserve energy. In some embodiments, the cycling may occur based on time of day or the detection of a nearby user mobile device 100. The beacon 308 may be configured to only broadcast a wireless signal during business hours. In some embodiments, the wireless module 408 emits a wireless signal that covers a predetermined proximity zone. As described in greater detail below, the beacon 308 may broadcast a unique beacon identification number over the wireless signal, which is detected by the user mobile device 100. In some embodiments, the size and shape of the proximity zone may be adjusted. For example the size of the proximity zone may be adjusted by altering the power level of the wireless signal. For example, the power level of the wireless signal may be set to one of 4 dB, 0 dB, −6 dB, or −23 dB.

In some embodiments, the beacon identification number is a unique identifier number that may not be detected if one is outside the defined proximity zone. In some implementations, a plurality of beacons 308 may be daisy chained together such that they create a unified proximity zone. For example, a content provider may wish to have a single proximity zone cover an entire store rather than having micro proximity zones distributed throughout the store. In this example, each of the daisy chained Beacons 308 broadcast the same Beacon identification number.

Being able only to detect the beacon identification number within the proximity zone allows the location engine 60 to determine a location of the user mobile device 100. For example, and as described in greater detail below, if the user mobile device 100 receives beacon identification number 779 from a beacon, then the client must be within the proximity zone of the beacon 308 having the identification number of 779. Accordingly, the location engine 60 would then associate the location of the beacon 308 with the user mobile device 100. Beacons also manage their battery life by managing the strength of their pings which may extend up to 70 m from a beacon, and the frequency of the ping, which may be 1 s, 3 s, 5 s, 10 s, 15 s, 20 s, or other selected number depending on how responsive the system is desired to be to passersby with user mobile devices 100.

Shopping and Postponing Purchase of an Item (a) Downloading and/or Actuating Application Code Instructions A user in one embodiment downloads from a networked server (not shown) a native app, being computer instructions for facilitating shopping, in one embodiment being the RainCheck App, to the user mobile device 100. The RainCheck App (being the instructions) is stored in one or more of the memories 206, 208, 210 of the user mobile device 100 and the application code instructions contained therein cause the processing unit 202 to operate as a shopping (browsing) engine 45 and a location engine 60.

The user opens an account (steps 500 and 600 as set out on FIGS. 2 and 3) such that the account once opened on the device 100 is opened on the agent 290.

In another embodiment, application code instructions are embedded in existing apps such as MyerOne, FlyBuys, and the like, so that those apps cause the user mobile device 100 to operate as a shopping (browsing) engine 45 and a location engine 60.

In another embodiment, application code instructions to enable the shopping (browsing) engine 45 API and the location engine 60 API to be called when a user is browsing a cooperating website on a browser, either on a mobile device or a desktop device, the browser being one such as Safari, Chrome, Firefox, Opera or Dolphin.

In another embodiment, a networked computer processing agent 290 receives or otherwise stores application code instructions to make the networked computer processing agent 290 act as a networked matching engine and a networked notification engine.

Selected embodiments provide a Raincheck button 99 (FIG. 18) which when actuated or selected, calls the API to store the stock identifying metadata in the networked computer processing agent, which may be the cloud or may be the mobile device 100, as well as other functions described herein.

Figure 18:
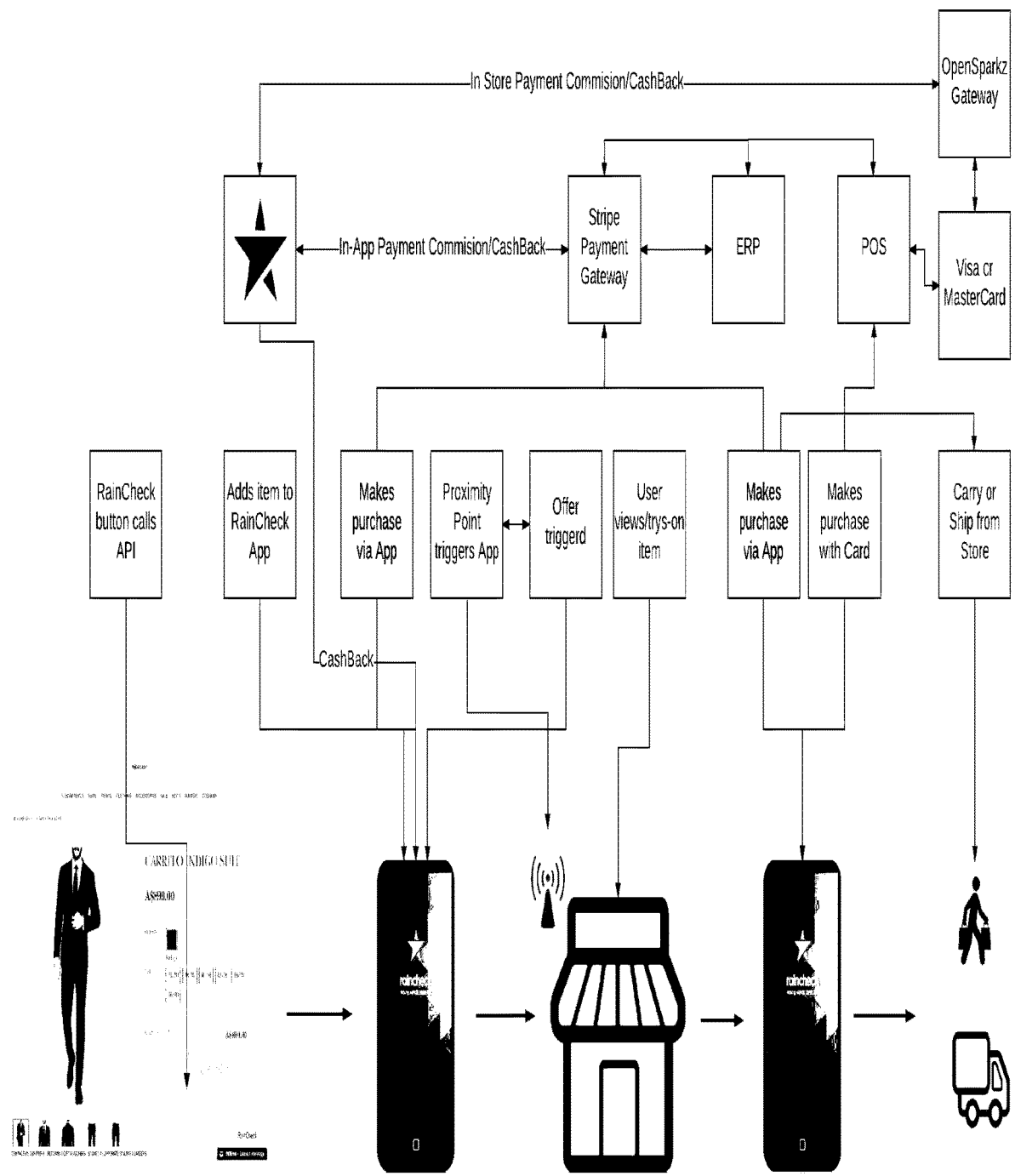
FIG. 18 is a schematic view showing some connections and a user journey when using the system to purchase goods.

The Raincheck button may be provided on a retailer's website, on a retailer's advertisement on social media, and may be integrated in many ways as described herein, so that when actuated, the Raincheck button may call the Raincheck API to open the Raincheck app and conduct the processes described herein and shown in FIG. 18. To be clear, the present technology may therefore be selectable processes accessible by a website, without having downloaded an app from an app store.

(b) Shopping

A user may browse and/or shop on the user mobile device 100, in a known way, for example, by using a web browser or the native Raincheck app, each of which displays items for selection on a display, in one embodiment being a touch-sensitive display 112. Shopping may also be undertaken on a different client 302, which may be a desktop computer using a mouse or keyboard (not shown) for selection of items.

As described herein, the technology via computer instructions, in one embodiment on the vendor's server, provides a Raincheck button 99 on the vendor's website pages which are configured to call the Raincheck app to upload the data.

Using one method on the mobile device 100, the native app provides user journeys such as those set out on the screenshots in FIGS. 12 to 15. In FIG. 13, for example, a plurality of online shopfronts are set out on a page as shown on screenshot 024. A user is able to provide and arrange a personalised array of brands in which they are particularly interested in browsing and potentially purchasing, albeit at a later time. Users provide that arrangement by selecting the "add brand" button 96 shown on screenshot 015 of FIG. 13. The user then selects the online shopfront and commences browsing, using screenshot 025 on FIG. 13. Flagging postponed purchases is made by pressing a raincheck button 99 on the screen (screenshot 014/026), (in a shopping engine 45) and the metadata from the selected item is sent (step 510) and received (step 610) in the respective devices. The matching engine is engaged at screenshot 028 when it finds the location of the stock and displays that information on 028 and 029. Location engine 60 is engaged at screenshot 030 to provide a map from the mobile device 100 to the item in the physical store. The Social media engine is engaged at screenshot 031/032/033 where the user shares their excitement at finding the item nearby.

The stock data is available to the mobile device 100 via network 150 from the computer processing agent 290 because of a data integration layer, called RainCheck Bucket 52. RainCheck Bucket 52 allows a retailer to plugin its product and inventory data into the networked computer processing agent instructions operating on a RainCheck Platform 51. RainCheck Bucket 52 supports a plurality of data formats such as for example CSV, XML, JSON and other suitable data formats. RainCheck Bucket 52 is configured to convert product and inventory data from the retailer into RainCheck Commerce Data (RCCD) format, which can be used by other components of the RainCheck platform 51.

In-App Inventory Aggregation

In order to make retail partners and brands product inventory available within the RainCheck platform and apps, requires the platform to have the ability to receive the data in various formats.

The source of this data can be either from an eCommerce management system or Enterprise Resource Planning system or even a system that can export data in a structured format such as CSV, JSON or XML etc.

In some cases the data is manually pushed or pulled from the source or can be scheduled in other cases the data is automatically transferred using an Application Programming Interface (API).

Once the data is received by the RainCheck platform system 10 it is structured in a unified format and fed to the mobile application layer and made available in real-time in the user interface (UI).

All inventory data is received in its native data structure and category tags e.g. name, category, SKU, price, colour, size, stock status etc. This structure is maintained in an asynchronous manner between the two systems so that updates can be send between the two systems for each retailer or brand.

By maintaining real-time product inventory data between the two systems allows the RainCheck system 10 to offer its users the same availability as the original source on a mobile platform.

The user may also shop by using the user mobile device 100, by utilising the camera module 143, and in that embodiment, an image recognition API would in that case be called to resolve images into a data format that can be decoded by the shopping (browsing) engine 45 and uploaded to the matching engine 50. Thus, a bar code, being single-dimensional or two-dimensional, or a QR code, or a website address, or a string of text, or a photograph of an item of clothing, may be utilised to conduct the shopping.

A user can also shop by selecting items on the display screen 112 of the user mobile device 100, or any suitable client 302, such that metadata for the selected item is transferred to a website's shopping cart or website's Wishlist. In this embodiment, the user mobile device 100, is caused via an API which is called so as to review the items which the user has placed on the wishlists and shopping carts for selected websites and native apps and extracts the metadata from those wishlists and shopping carts and places them on the user mobile device 100 after a selected period of time of inactivity on the website, or at the time of closing a browser window or closing the native app.

Furthermore, a user can shop and/or postpone a purchase when reviewing or engaging in social media. In this embodiment, an item may be displayed on a social media app, in a Facebook, Linkedin or Twitter newsfeed, for example, or a Snapchat Discovery video or photograph, whether on a natural post, a shared post, or an advertisement displayed on the newsfeed, or other suitable method. Other examples on social media include direct MMS or SMS messages on a web messaging service, or hyperlinks sent by messaging clients. In these embodiments, a raincheck button 99 or icon is caused to be displayed by the social media software which then transfers metadata relating to a nearby displayed item to a wishlist or shopping list on the shopping (browsing) engine 45 on the user mobile device 100, or other client 302.

Another way of shopping is via television. An API on the user mobile device 100 is in data communication with, for example, an AppleTV SDK/API which in use digitises streamed TV content and aggregates selected items from the feed and presents them to the user on the display 112 of the user mobile device 100.

Selecting the item on the display 112 can be done by swiping the raincheck button 99 or conducting some other kind of haptic gesture on the raincheck button 99. Shopping may also be done by tapping user mobile device (smartphone) 100 so as to actuate the (RFID/NFC/Bluetooth chip which is resident in the device 100. In that embodiments, connected print, which has RFID chips and other induction chips, NFC, passive or active, would be utilised so the user could tap their user mobile device 100 on a paper catalogue so as to save metadata relating to an item.

Yet another way of presenting items for a user to browse on a touch sensitive screen is using an Inventory Ad engine 58 which is application code instructions configured to receive data from user search engine queries on the network user device 100 and facilitate presentation of online advertisements of retailer inventory data on web pages that show results from the search engine queries. To facilitate the presentation of InventoryAds on the display screen 112 in response to queries, Raincheck platform 51 is configured to convert retailer data from RainCheck Commerce Data (RCCD—discussed hereinbelow) to data format supported by search engines such as for example Google inventory data format.

(c) Postponing a Purchase . . . the Raincheck.

The step of uploading the item's metadata to the matching engine 60 so as to foreshadow a possible subsequent purchase of the item on or offline is undertaken when a user selects or actuates a raincheck button 99. One or more raincheck buttons 99 are caused to appear on the display 112 of the user mobile device 100 by the application code instructions which are executed on the user mobile device 100 processor 120, either by the browser or by downloading the native app, or some native app of the retailer, or the like.

Raincheck button 99 can be displayed on touch-sensitive display 112, the Raincheck button 99 configured to call computer application code instructions to place information identifying a relevant or nearby item on the screen, in this case jacket 97, onto a postponed purchase list (shown on FIG. 13, screenshot 014, "My list").

If a raincheck button 99 is actuated then associated metadata for an item displayed on the screen 112 at that time, or associated metadata for an item that is related in some other way to the raincheck button 99 such as for example by proximity to the selected raincheck button 99, is uploaded to the matching engine 60 or queued to be uploaded at a later time when a network is available.

The metadata that is uploaded to the matching engine 60 is Stock Keeping Unit (SKU) data, image, price, colour, size, category and the like.

Figure 2:
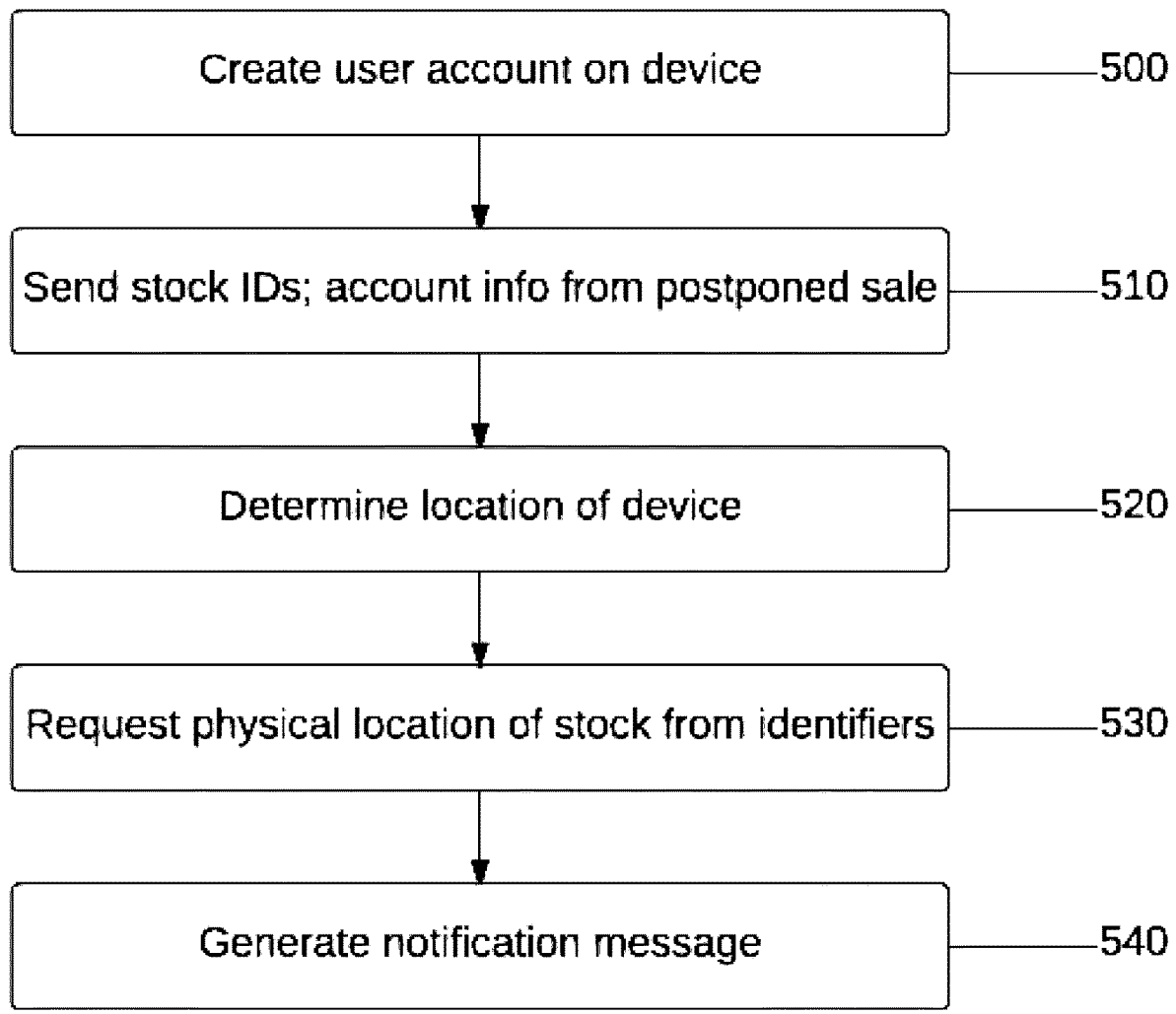
FIG. 2 is a process showing an embodiment of the technology conducted on a user mobile device, stepping through steps 500 to 540, each one described herein.
Figure 3:
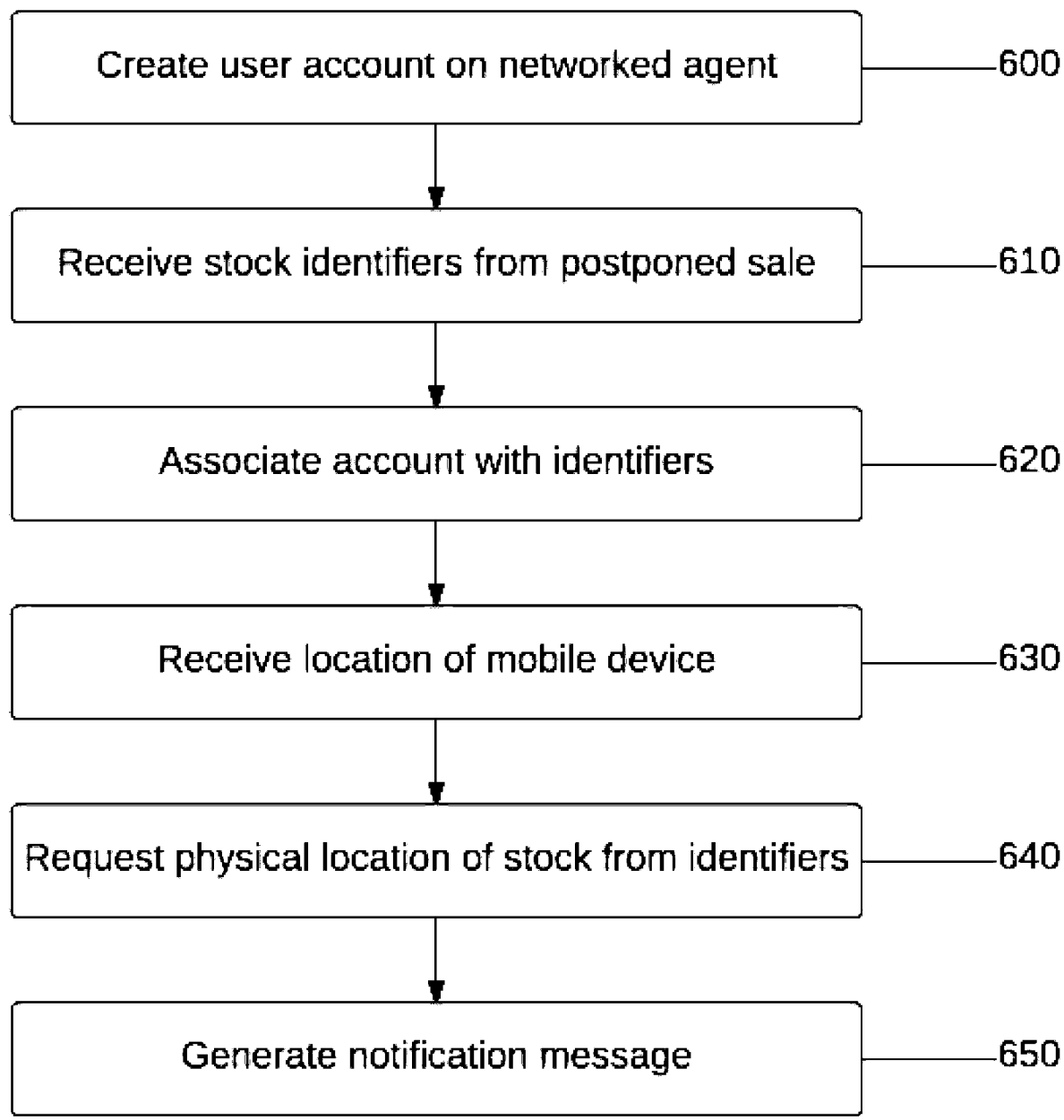
FIG. 3 is a process showing an embodiment of the technology conducted on a networked computer processing agent, stepping through steps 600 to 650, each one described herein.

This step is shown in FIG. 2 at step 510 and at FIG. 3 in step 620 (associate the items with the account information).

(d) Resolving the Location of the User . . . the Location Engine

When a user and his mobile device enters a proximity zone of a beacon 308, a radio frequency signal is received by the user mobile device 100 in the network module 108. The beacon 308 sends its ID code and the location engine 60 interprets the location by reviewing a database in the location engine 60. That is, a store location ID is received from the portion of the database corresponding to the beacon ID, and the location of the user mobile device 100 is resolved.

The RainCheck Platform 51 includes Beacon Management engine 54 which is configured to manage beacons by store, site and region. Beacon Management engine 54 is configured to deploy beacons 308, record and monitor beacon battery usage, record and track beacon visits by various users, review alert statistics and like functionality and present analysis on a display 112 of a retailer's networked mobile device 100.

Resolution of the location of the user mobile device 100 can be done with a GPS module 135 or with geo-fencing. A geofencing module on the user mobile device 100 is configured to map out an area, for example, a shopping mall, and then the location engine 60 identifies that the user has entered that geofenced area. At that time, the signals of beacons are used to narrow down the location to store and product level.

When the user launches the RainCheck App, it will send the user mobile device ID 100 to the location engine 60 with an HTTPS request and then the location engine 60 will save the user mobile device ID in the location engine database. Deployed beacon UUIDs 308 will be stored in the location engine 60 database through the web based user interface of the location engine. When user enters the store, the RainCheck app will communicate with beacon 308 through network modules 108 and 408, using Bluetooth Low Energy (BLE) technology and notify location engine 60 through HTTPS request that user mobile device 100 is in store.

Geo-Fencing regions will be stored with a web user interface of the location engine 60. When user launches the RainCheck app, the app will ascertain the current geo-location using GPS module 135 or beacons 308 to location engine 60. Then the location engine 60 will check if the user mobile device 100 is in any selected geo-fencing region, using ESRI protocols.

The RainCheck app will instruct the location engine 60 to send updated location information to notification engine 70 whenever the user location according to GPS 135, Beacon 308 or Geo-Fencing module is updated.

This step is shown in FIGS. 2 and 3 at steps 520 and 630 in the respective devices.

The method includes the step of attenuating the notification engine so that it operates only during selected hours outside the business day, such as weekends, lunchtimes and late night shopping. Otherwise workers in cities, near retail outlets, will be notified when they are trying to concentrate on work.

It is to be understood that all the engines including the shopping (browsing) engine 45, matching engine 50, notification engine 70, location engine 60 can be partially operated on server side or on client side, or both, depending on resources.

(e) Matching Engine Engagement

Matching engine 50, location engine 70 and notification engine 60 are cooperating logical application components running on an application server, deployed on Linux in a cloud-based computing environment. In some embodiments, the engines 50, 60 and 70 are deployed in a mixed cloud environment with Amazon AWS and IBM BlueMix on suitable servers described hereinabove. Load balancers and auto scaling are deployed to automatically start new servers if the load of network requests increases above a selected level. The application server which hosts matching engine 50, location engine 60 and notification engine 70 include a web based user interface and uses a centralized database host on AWS and BlueMix shared between the three engines.

Matching engine 50 includes RainCheck Bucket 95 which is a software process layer which in use integrates and aggregates the product metadata and inventory data from a Retailer backend system, which itself is part of the stock location engine. The data source can be software by Apparel21 Retailer API or Google inventory feed or suitable data source software.

This matching is conducted at steps 530 and 640 in that the data uploaded as potentially postponed sales is matched with stock data relating to available stock in the physical shop.

The matching engine is provided with a link verification engine (not shown) which checks links for stocked items. When the computer processing system 200 downloads website pages it checks whether there is any stock remaining by communicating with the vendor's server.

It is to be understood that all the engines including shopping (browsing) engine 45 matching engine 50, notification engine 70, location engine 60 can be partially operated on server side or on client side, or both, depending on resources.

(f) Notification Engine

When Notification engine 70 receives a notification of location update from location engine 60, the Notification engine 70 will cause Matching Engine 50 to query the Retail inventory data via the stock location engine 80 via network 250. The stock location engine 80 will be instructed to send product information via the network 250 back to the user mobile device 100 on which is running the RainCheck app.

Then the RainCheck app will cause a local push notification to be actuated on user mobile device 100 and show user the push notification on display 112 or using audio signal, vibration signal, light signal or other notification method. When user actuates the notification on the display 112 (in that example) by for example, swiping on the touch sensitive display 112, the user mobile device 100 will launch the RainCheck app to see the detailed production information generated from the metadata.

Notification Engine 70 deploys messages using software by third party vendors such as for example Twillo, Bulletin and in some embodiments, Telstra, to send SMS. The notification engine 70 of the RainCheck app will also use iOS SDK to send SMS inside the app when the app is running on iOS.

The notification engine can be set by the user to notify when an item is a suitable distance from the user's mobile device: say, 50 km, 5 km, 1 km, 500 m, 150 m, 100 m, 50 m, 10 m and like distances greater or in between.

These are steps 540 on the device and 650 on the agent.

It is to be understood that all the engines, including shopping (browsing) engine 45, matching engine 50, notification engine 70, location engine 60 can be partially operated on server side or on client side, or both, depending on resources.

(g) Purchasing the Postponed Item

Once the user has been notified by the notification engine 70 of the proximity of the store with the item (usually within 200 m), and a map provided to the store, the user may purchase the item in store. The user may purchase online, offline, in-app and suitable like methods of payment.

The purchase may be subject to a discount or other value condition provided by Deal Management engine 55. Deal management engine 55 includes application code instructions which configure the network processing agent 290 to communicate with the notification engine 70 deals and promotions dynamically to user mobile device 100. When the user mobile device 100 is in a proximity zone of beacon 308, the network module 108 will communicate with the beacon 308 and will be recognized by beacon 308. This recognition will trigger a data flow back to stock location engine 80 and the matching engine 50 and if the user of the mobile device 100 qualifies for a selected discount, with or without requiring the purchase of other items, will push one or more deals and promotions to the user mobile device 100. A retailer can send a customized discount/promotion based on previous buying behaviour of the customer by reviewing buying history of the Raincheck platform 51.

The deal management engine 55 may be in data communication with the campaign management engine 57 which will facilitate the provision by a retailer, via the stock location engine 80 and/or the networked processing agent 290, to tailor selected promotions and other campaigns based on various customer sectors, region, age group, gender and so on, being data which is stored in a user profile and obtained by user input through input device 112, or from networked user device 100 itself.

In store, a user therefore may tap, shake, or swipe the display on their user mobile device 100 to purchase the item, while they are standing at the checkout 97 or while they have the app open on their mobile device. Alternatively tapping on a POS system such as with Apple/Android Pay (eWallets), another phone and like movements with like protocols may provide a purchase signal which will provide secure data communication between a mobile payment engine 56 and a bank account of a user.

In-App Payments & Orders

In order to allow user to buy items from within app directly, RainCheck platform has integrated payment gateway (using Stripe and/or an gateway), which can support transactions within the RainCheck shopping processing system 200.

When a user completes a purchase an order is created inside the app 10, and the RainCheck payment gateway will have several options to fulfill the order.
  fulfill the order by RainCheck. The order will go to the RainCheck distribution center to deliver the product to consumer.
  create an external order and send it to a Retailer's eCommerce system. The Retailer will fulfil the product(s) order to the user.
  RainCheck can also support ship from retailer store. Because RainCheck has dynamic inventory data, RainCheck can match the stock in physical store with the order, and tell user to collect the product from the nearest store.
  User will also have several options to return the product
  If the product is delivered by RainCheck, the user needs to return product to RainCheck. RainCheck will then refund the payment to user.
  If the product is delivered by a Retailer, the user needs to return product to Retailer. Retailer will then refund the payment to user.
  If the product is picked up by user from Retailer store, user can return the product to the store. And Retailer will refund the payment to user.
A suitable debit card may be used as a method of payment, such as a Raincheck debit card which may be pre-loaded with funds by transferring from a user's bank account. BitCoin protocols may be used. It may be that the debit card or BitCoins may have account access details loaded into the mobile payment engine 56 so as to facilitate payment.

Useful POS protocols may be any suitable, and may include any suitable computerised POS system, including OPOS and JavaPOS, both of which conform to the Unified-POS standard led by The National Retail Foundation, Apple Pay, EMV Payment Tokenisation, Android Pay using Host Card Emulation (HCE), RainCheck Visa Debit Card using Visa Integrated Circuit Card Specifications (VIS), or Bit-Coins.

In-Store Payment Attribution

RainCheck system 10 interacts with Visa, MasterCard and other credit card issuers to allow users to receive special discount offers including cash back when the user pays on POS terminal using debit/credit card.

The method includes the step of receiving a user's credit card details in the computer processing system 200, and generating a token which will identify the credit card. The token will also be saved in RainCheck platform 10.

RainCheck platform 10 will then provision all POS merchant ID in physical stores and save all merchant ID information in database. RainCheck platform will also match each merchant ID to specific physical store location.

Thus, when a user completes a payment transaction, the RainCheck platform 10 will already have the details of the user stored on the database including their debit/credit card details, the POS and the physical store location. Based on these information data-points, the RainCheck platform can give the user a specific discount which can be detailed as on specific hour, at a specific day and in a specific store for a specific Retailer.

(h) Other Features of the System

A CRM Integration engine 59 is provided in the raincheck platform 51 on the networked computer processing agent 290 which will allow a retailer to integrate their existing CRM system into the RainCheck platform 59, so retailer can integrate the data created in RainCheck platform 51 into CRM data.

Figure 8:
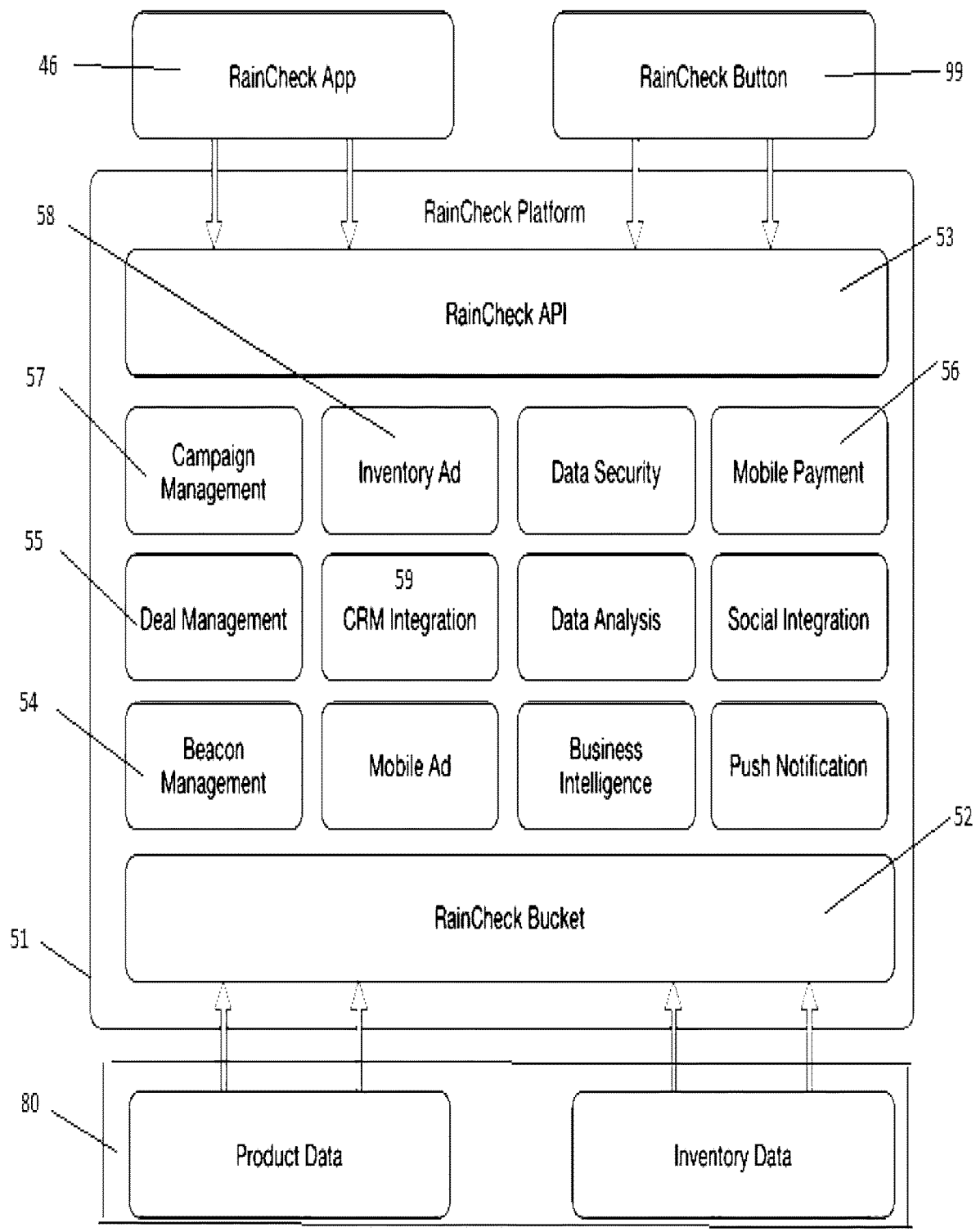
FIG. 8 is a schematic system-wide view of an embodiment of the present technology showing various processing engines in module form being part of a wider networked computer processing platform.
Figure 9:
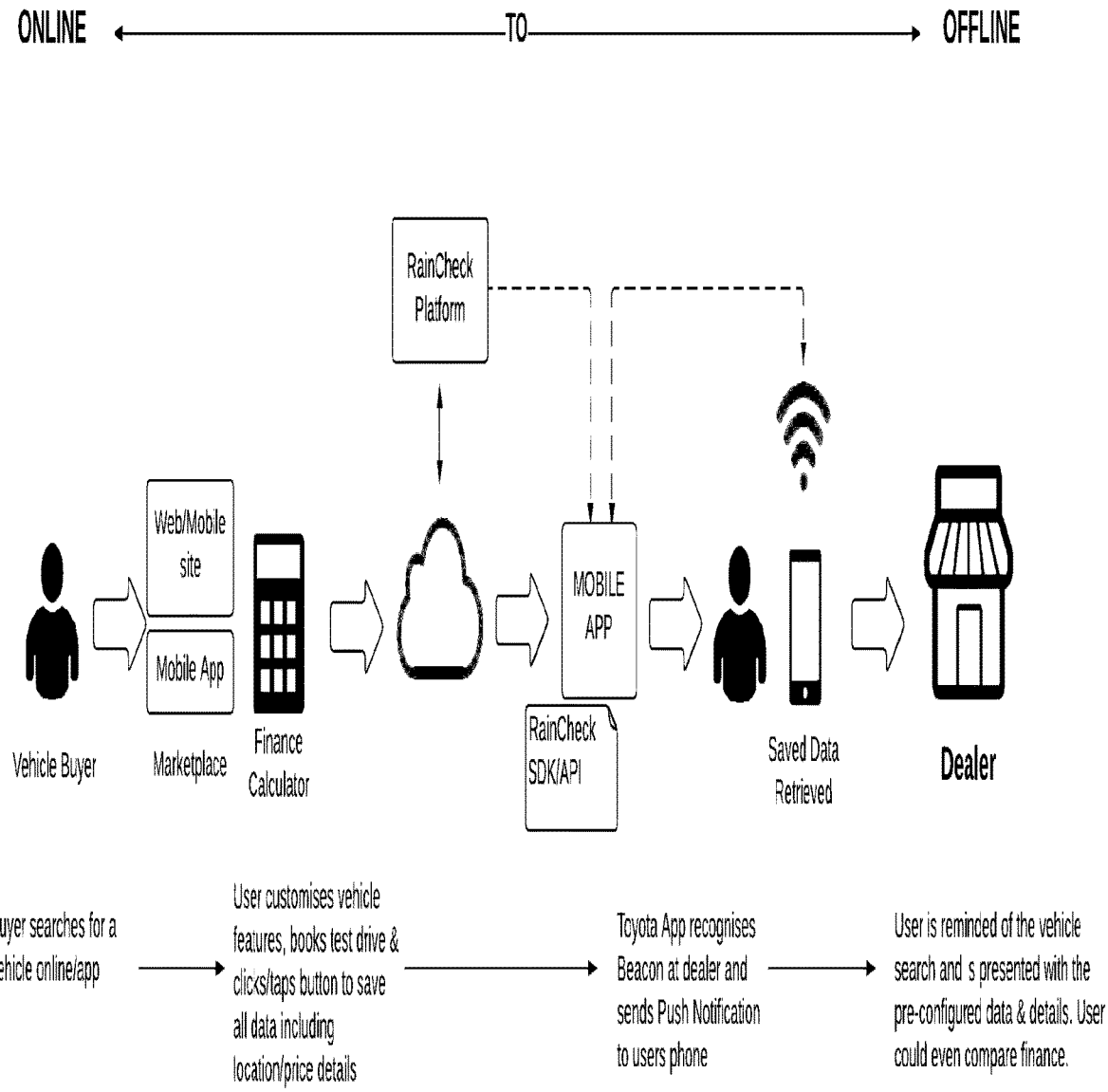
FIG. 9 is a schematic view of an embodiment of the technology relating to in-store purchases of cars after shopping for cars online and postponing their purchase.
Figure 10:
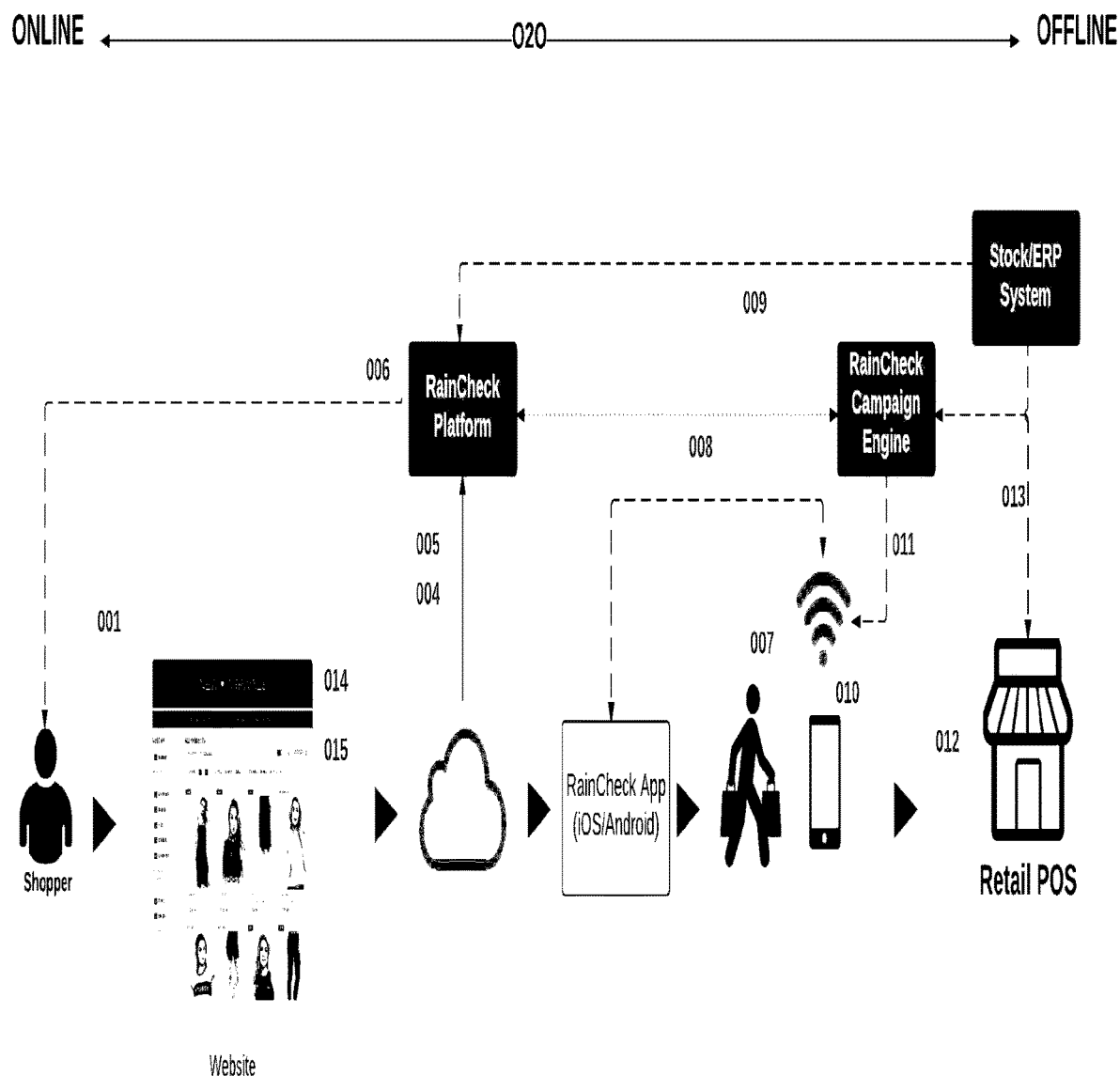
FIG. 10 is a schematic view of an embodiment of the technology showing online browsing, postponing purchases and subsequent location near a store for purchase prompt.

A Mobile Ad engine shown in FIG. 8 is provided which will allow a participating retailer to place different kinds of advertisements on the networked user mobile device 100 which can include the raincheck button 99 embedded in the advertisement for selection by the user.

Figure 15:
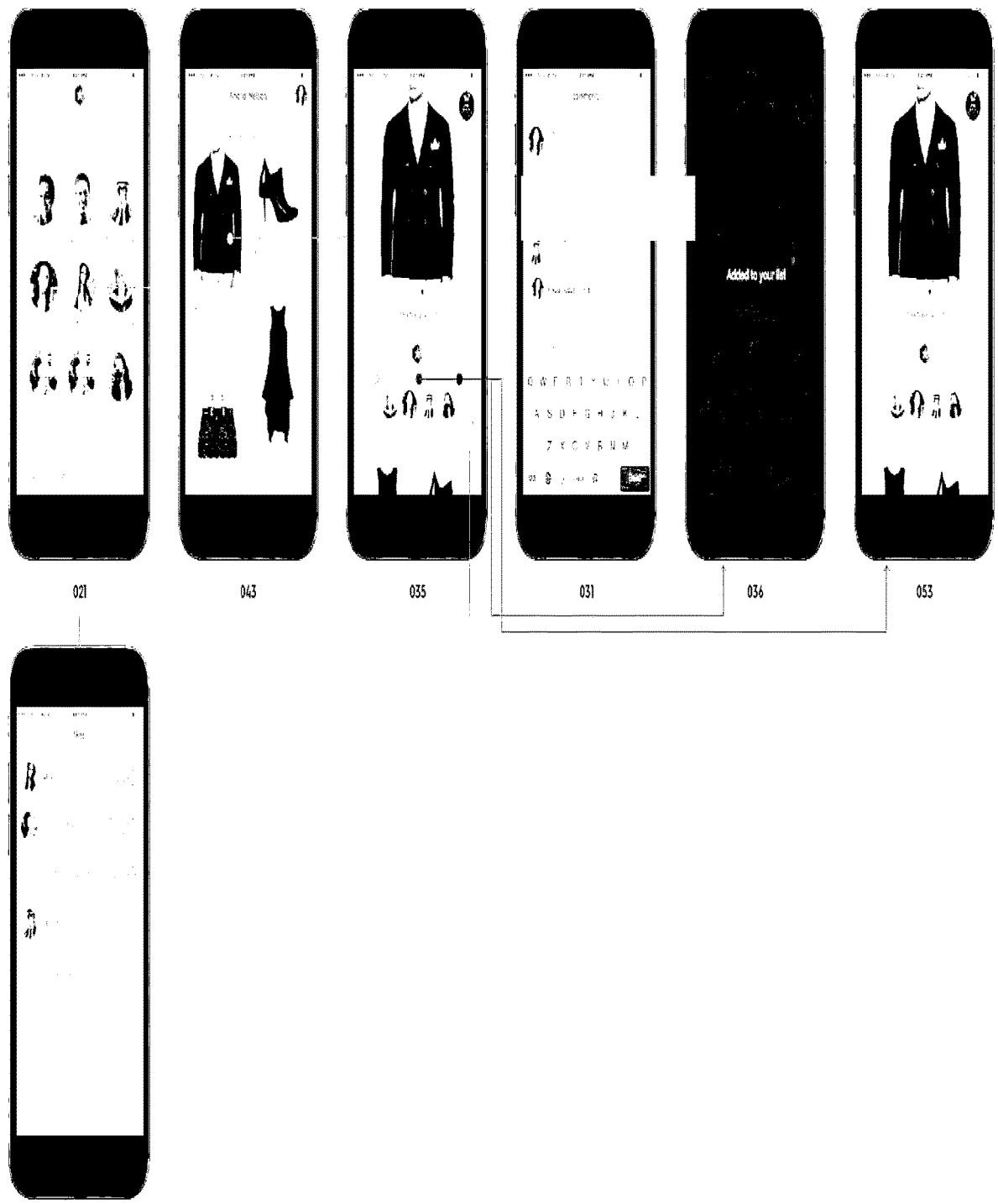
FIG. 15 is a series of screen shots of a user journey on a mobile device which shows a user sharing an item with their social network, and another user adding that item to their postponed item list for subsequent purchase when their mobile device is within a selected distance of a physical store which stocks the item.

A Social Integration engine shown in FIG. 8 as part of the RainCheck platform 51 will integrate social networks such as Facebook, Google+, LinkedIn and Pinterest into the RainCheck platform 51, the advantage being that users can share their RainChecked items easily with their social media contacts and friends as shown in user journey in FIG. 15 where a user is sharing their items and another user has added that shared item to their own list for postponed purchase.

A data Analysis engine shown in FIG. 8 as part of the Raincheck platform 51 will allow a participating retailer to generate a plurality of different kinds of data reports based on beacon statistics, customer behaviour statistics and so on. Every time a user approaches a beacon with their user networked mobile device, it is recorded by the Raincheck app 46 and that information is retrieved by the Data analysis engine shown in FIG. 8 for forwarding to the networked computer processing agent 290 for analysis so as to incentivise various users with the Deal management engine 55 and other motivations to buy items.

It is contemplated to combine the location of an item with a fitness or other goal, such as wherein a user may be given a special discount for the next ten minutes if a person can get to the offline shop by walking the city blocks to reach them.

A Data Security engine shown in FIG. 8 in some embodiments is provided for a secured layer of protection of retailer data and consumer data. The arrangement is such that the RainCheck platform uses Oauth to authenticate the data client who needs to consume the data stored in RainCheck Bucket 52. Data security engine also implements different levels of mechanisms to secure the data.

A Business Intelligence engine shown in FIG. 8 is provided to facilitate deeper retailer understanding of user behaviour through data mining and machine learning. It will also help to recommend products to user based on analyzing the historical data of user behaviour and groups of user behaviour.

RainCheck Button 99 in some embodiments allows a retailer to plug into RainCheck platform service by putting a raincheck button 99 on an existing eCommerce website. When user clicks the raincheck button 99, it will call RainCheck API to save the item in RainCheck cloud-based shopping list as hereindescribed.

RainCheck App 46 is native mobile application which allow RainCheck user to browser RainCheck items they have saved in cloud based shopping list. When user enters into store, user mobile device 99 will wirelessly communicate with beacons deployed in store. Notification about the product information will be pushed to the device. The information is highly related with the item saved in cloud based shopping list.

User can add comments to the product, like the product, share product to their social friends and so on. User can browse items saved by their friends and like the product if they want. User can easily check nearby stores on the map and choose the best route to the nearest store.

In one embodiment, various aspects of the invention are embodied in computer software programs/applications. The programs include computer-readable instructions which can be executed by a processing unit (such as unit 202) to implement the relevant aspects of the invention. The instructions may be conveyed to the computer processing system by means of a data signal in a transmission channel. Examples of such transmission channels include wired or wireless network connections enabled by the communications interface 220 and various communications protocols.

(i) Reward Points—RainDrops

When a user actuates the RainCheck button 99, the user earns a raindrop, which is added to their account. Raindrops are reward or loyalty points. Software designed and implemented by SecurePoint converts a RainDrop to virtual currency as is known in their published system.

Other Features of Embodiments

Figure 20:
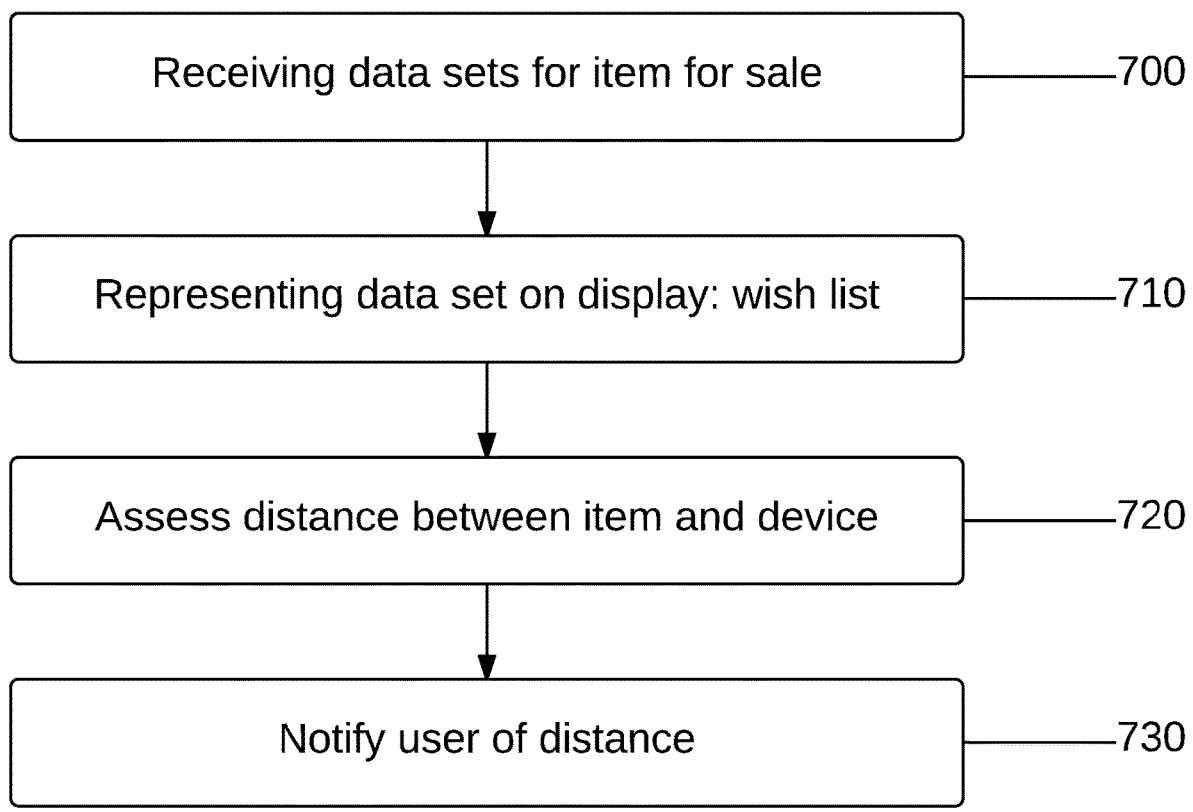
FIG. 20 is an example method in accordance with an embodiment of the system.

Referring to at least FIG. 20 there is shown a method of facilitating a postponed purchase of an item to a user, the method including the steps of:

receiving at least one data set relating to an item for sale into a networked computer processing device (at 700);

representing at least one of the data sets on a display of the networked computer processing device (at 710);

assessing a distance between a physical item for sale associated with the at least one data sets and the networked computer processing device (at 720);

notifying the user via the networked computer processing device of the distance to the physical item (at 730).

The method includes the step of checking the location of the mobile computer processing device against the location of an offline purchase at the time of a purchase so as to verify that the user was responsible for the purchase.

Figure 17:
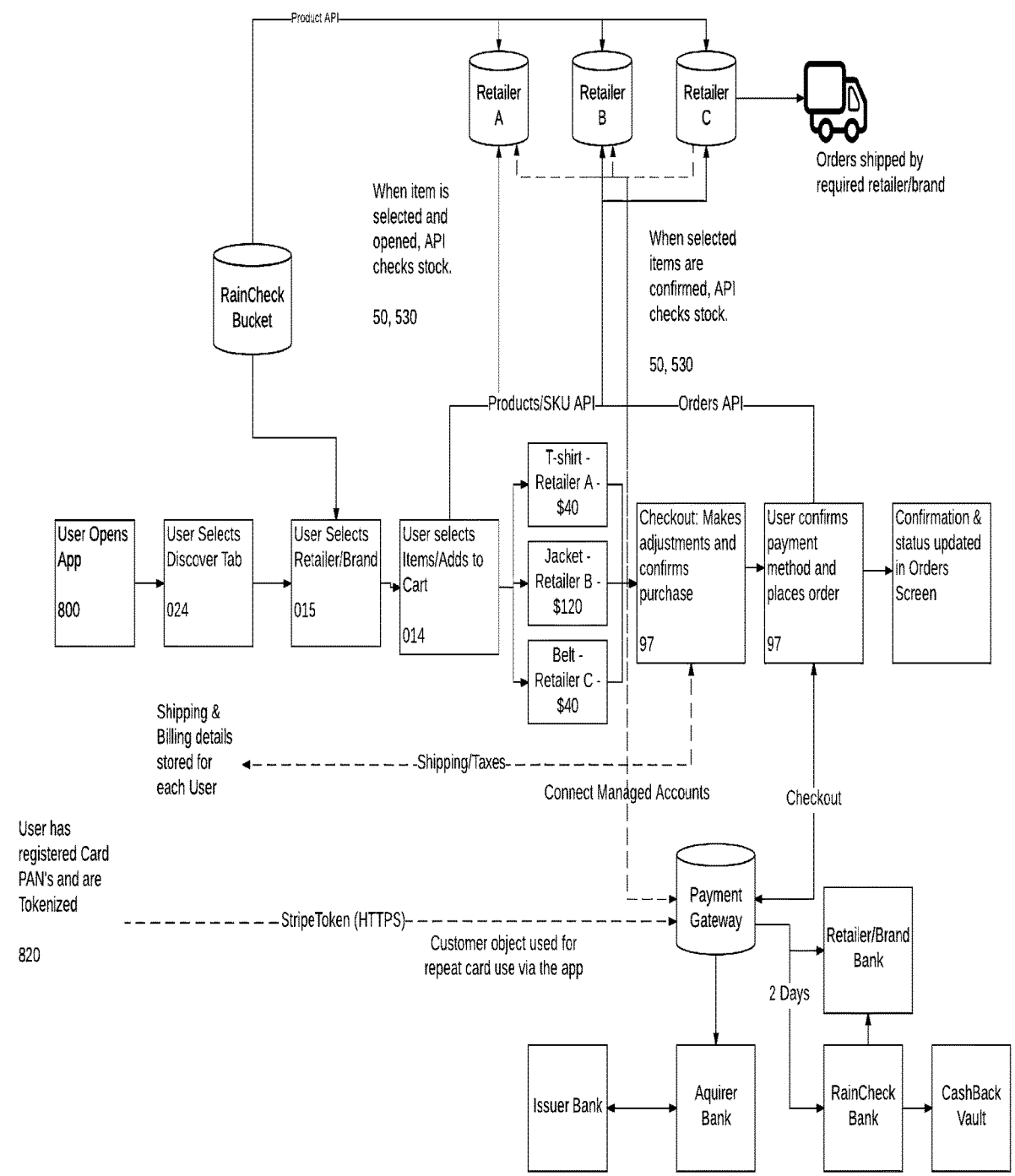
FIG. 17 is a user journey hybrid with schematic view of the system.
Figure 19:
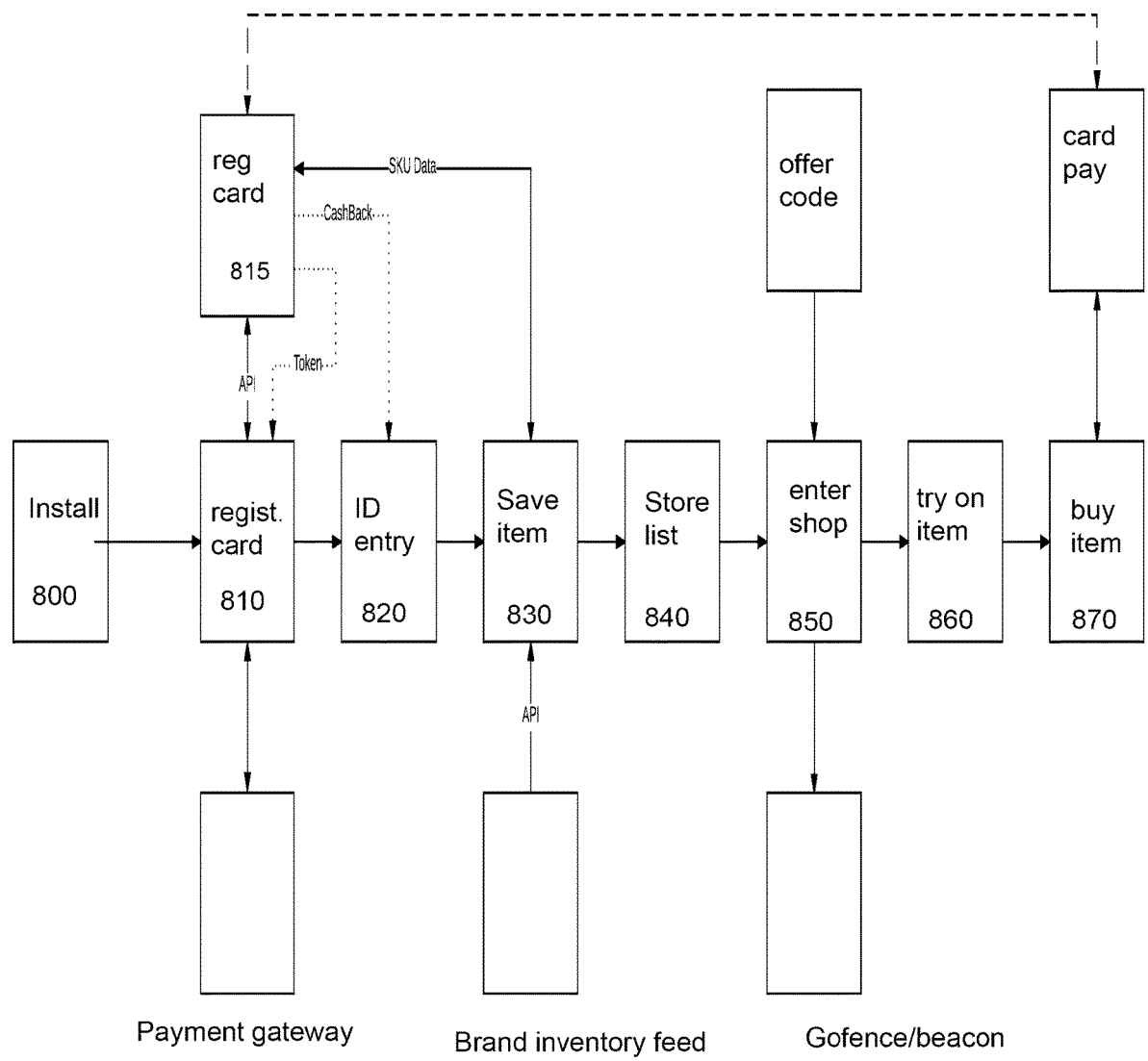
FIG. 19 is a user journey/schematic view of the system.

In FIGS. 17 and 19 a user journey can be seen. First at step 800, a user downloads instructions onto their mobile device 100. Then, at step 810, a user creates an account (step 500 in FIG. 2, step 600 at FIG. 3), and registers their payment cards with the account such that they are stored in a remote server 815 so that the details are not stored on the mobile device 100. A token engine (not shown) in the system facilitates the registration by providing at step 820 a unique token associated to the user's account so that only the token need to be used in a transaction. The token may be randomly generated.

At step 830 the system presents to the user on their mobile device 100 a plurality of items so that they can be selected by the user and saved onto a wish or raincheck list sorted in the mobile device or on a remote server matching engine 50 (step 840).

The user may approach a physical store and below a threshold distance at step 850. A geofence or beacon triggers a notification by the notification engine 70 onto the mobile device 100 and then the user enters the store at 860.

The user then pays with an offline card in which case the registered details are extracted from server 815 and the purchase is recorded as a Raincheck sale and the vendor is debited. If the user uses their mobile device to pay, the token is used and the token is matched with the user's registered bank/card details.

The Portable Electronic Device Architecture

Figure 16:
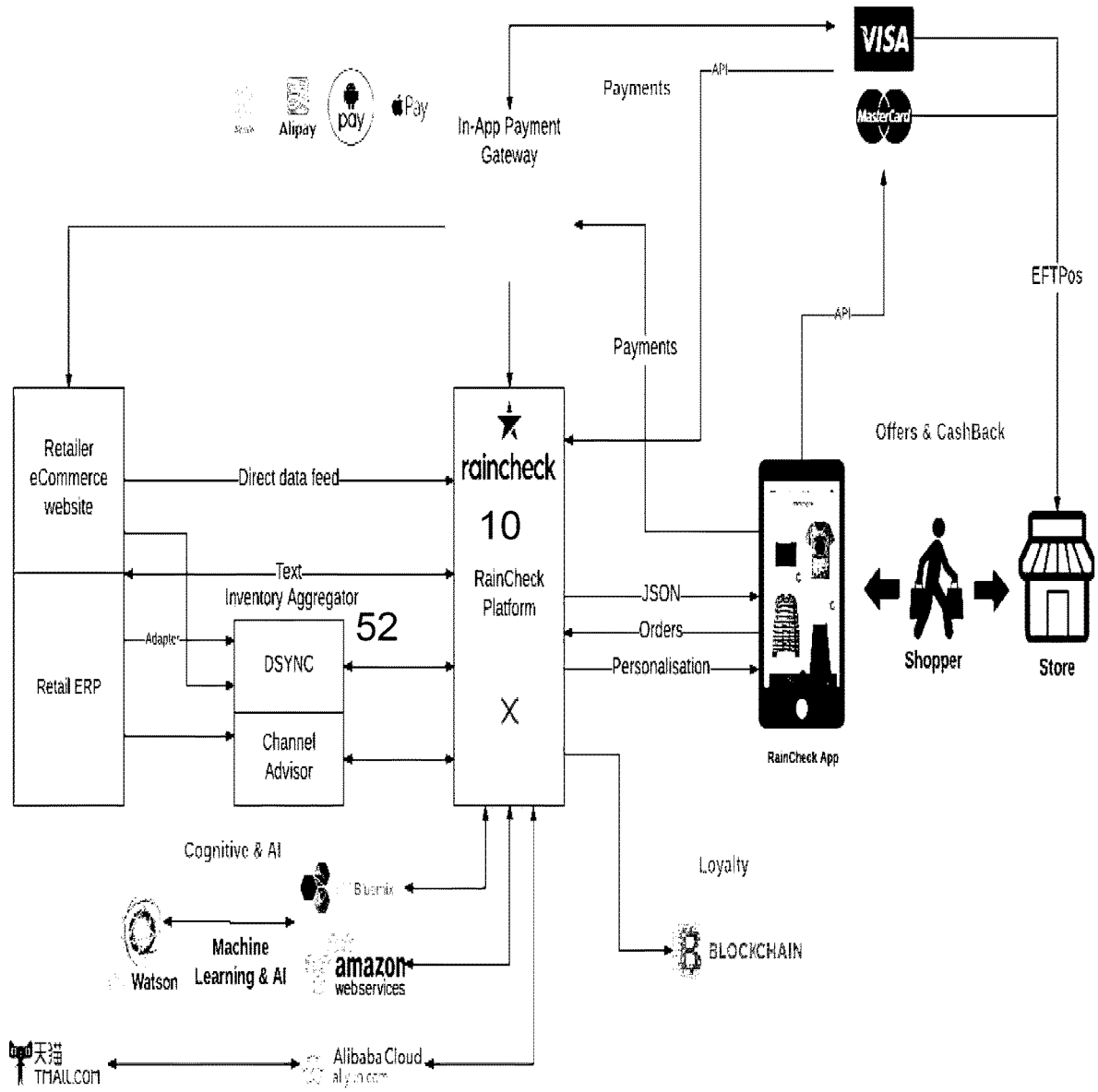
FIG. 16 is a schematic view of the system somewhat similar to that shown in FIG. 1.

A portable electronic device is shown in FIGS. 15 and 16 on which a preferred embodiment of the invention may be carried out. The device is a portable communications device such as a mobile telephone that also contains other functions, such as PDA and/or music player functions.

The user interface may include a physical click wheel in addition to a touch screen or a virtual click wheel displayed on the touch screen. A click wheel is a user-interface device that may provide navigation commands based on an angular displacement of the wheel or a point of contact with the wheel by a user of the device. A click wheel may also be used to provide a user command corresponding to selection of one or more items, for example, when the user of the device presses down on at least a portion of the wheel or the center of the wheel. Alternatively, breaking contact with a click wheel image on a touch screen surface may indicate a user command corresponding to selection. For simplicity, in the discussion that follows, a portable multifunction device that includes a touch screen is used as an exemplary embodiment. It should be understood, however, that some of the user interfaces and associated processes may be applied to other devices, such as personal computers and laptop computers, that may include one or more other physical user-interface devices, such as a physical click wheel, a physical keyboard, a mouse and/or a joystick.

The device supports a variety of applications, such as a telephone application, a video conferencing application, an e-mail application, an instant messaging application, a blogging application, a digital camera application, a digital video camera application, a web browsing application, a digital music player application, and/or a digital video player application.

The various applications that may be executed on the device may use at least one common physical user-interface device, such as the touch screen. One or more functions of the touch screen as well as corresponding information displayed on the device may be adjusted and/or varied from one application to the next and/or within a respective application. In this way, a common physical architecture (such as the touch screen) of the device may support the variety of applications with user interfaces that are intuitive and transparent.

The user interfaces may include one or more soft keyboard embodiments. The soft keyboard embodiments may include standard (QWERTY) and/or non-standard configurations of symbols on the displayed icons of the keyboard. The keyboard embodiments may include a reduced number of icons (or soft keys) relative to the number of keys in existing physical keyboards, such as that for a typewriter. This may make it easier for users to select one or more icons in the keyboard, and thus, one or more corresponding symbols. The keyboard embodiments may be adaptive. For example, displayed icons may be modified in accordance with user actions, such as selecting one or more icons and/or one or more corresponding symbols. One or more applications on the portable device may utilize common and/or different keyboard embodiments. Thus, the keyboard embodiment used may be tailored to at least some of the applications. In some embodiments, one or more keyboard embodiments may be tailored to a respective user. For example, based on a word usage history (lexicography, slang, individual usage) of the respective user. Some of the keyboard embodiments may be adjusted to reduce a probability of a user error when selecting one or more icons, and thus one or more symbols, when using the soft keyboard embodiments.

Attention is now directed towards embodiments of the device. FIG. 1 is a block diagram illustrating a portable multifunction device 100 with a touch-sensitive display 112 in accordance with some embodiments. The touch-sensitive display 112 is sometimes called a "touch screen" for convenience. The device 100 may include a memory 102 (which may include one or more computer readable storage mediums), a memory controller 122, one or more processing units (CPU's) 120, a peripherals interface 118, RF circuitry 108, audio circuitry 110, a speaker 111, a microphone 113, an input/output (I/O) subsystem 106, other input or control devices 116, and an external port 124. The device 100 may include one or more optical sensors 164. These components may communicate over one or more communication buses or signal lines 103.

It should be appreciated that the device 100 is only one example of a portable multifunction device 100, and that the device 100 may have more or fewer components than shown, may combine two or more components, or a may have a different configuration or arrangement of the components. The various components shown in FIG. 1 may be implemented in hardware, software or a combination of both hardware and software, including one or more signal processing and/or application specific integrated circuits.

Memory 102 may include high-speed random access memory and may also include non-volatile memory, such as one or more magnetic disk storage devices, flash memory devices, or other non-volatile solid-state memory devices. Access to memory 102 by other components of the device 100, such as the CPU 120 and the peripherals interface 118, may be controlled by the memory controller 122.

The peripherals interface 118 couples the input and output peripherals of the device to the CPU 120 and memory 102. The one or more processors 120 run or execute various software programs and/or sets of instructions stored in memory 102 to perform various functions for the device 100 and to process data.

In some embodiments, the peripherals interface 118, the CPU 120, and the memory controller 122 may be implemented on a single chip, such as a chip 104. In some other embodiments, they may be implemented on separate chips.

The RF (radio frequency) circuitry 108 receives and sends RF signals, also called electromagnetic signals. The RF circuitry 108 converts electrical signals to/from electromagnetic signals and communicates with communications networks and other communications devices via the electromagnetic signals. The RF circuitry 108 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. The RF circuitry 108 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a plurality of communications standards, protocols and technologies, including but not limited to Global System for Mobile Communications (GSM), Enhanced Data GSM Environment (EDGE), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11 n), voice over Internet Protocol (VoIP), Wi-MAX, a protocol for email, instant messaging, and/or Short Message Service (SMS)), or any other suitable communication protocol, including communication protocols not yet developed as of the filing date of this document.

The audio circuitry 110, the speaker 111, and the microphone 113 provide an audio interface between a user and the device 100. The audio circuitry 110 receives audio data from the peripherals interface 118, converts the audio data to an electrical signal, and transmits the electrical signal to the speaker 111. The speaker 111 converts the electrical signal to human-audible sound waves. The audio circuitry 110 also receives electrical signals converted by the microphone 113 from sound waves. The audio circuitry 110 converts the electrical signal to audio data and transmits the audio data to the peripherals interface 118 for processing. Audio data may be retrieved from and/or transmitted to memory 102 and/or the RF circuitry 108 by the peripherals interface 118. In some embodiments, the audio circuitry 110 also includes a headset jack (not shown). The headset jack provides an interface between the audio circuitry 110 and removable audio input/output peripherals, such as output-only headphones or a headset with both output (e.g., a headphone for one or both ears) and input (e.g., a microphone).

The I/O subsystem 106 couples input/output peripherals on the device 100, such as the display system 112 and other input/control devices 116, to the peripherals interface 118. The I/O subsystem 106 may include a display controller 156 and one or more input controllers 160 for other input or control devices. The one or more input controllers 160 receive/send electrical signals from/to other input or control devices 116. The other input/control devices 116 may include physical buttons (e.g., push buttons, rocker buttons, etc.), dials, slider switches, joysticks, click wheels, and so forth. In some alternate embodiments, input controller(s) 160 may be coupled to any (or none) of the following: a keyboard, infrared port, USB port, and a pointer device such as a mouse. The one or more buttons (e.g., 208, FIG. 2) may include an up/down button for volume control of the speaker 111 and/or the microphone 113. The one or more buttons may include a push button (e.g., 206, FIG. 2). A quick press of the push button may disengage a lock of the touch screen 112 or begin a process that uses gestures on the touch screen to unlock the device. A longer press of the push button (e.g., 206) may turn power to the device 100 on or off. The user may be able to customize a functionality of one or more of the buttons. The touch screen 112 is used to implement virtual or soft buttons and one or more soft keyboards.

The touch-sensitive display system 112 provides an input interface and an output interface between the device and a user. The display controller 156 receives and/or sends electrical signals from/to the display system 112. The display system 112 displays visual output to the user. The visual output may include graphics, text, icons, video, and any combination thereof (collectively termed "graphics"). In some embodiments, some or all of the visual output may correspond to user-interface objects, further details of which are described below.

A touch screen in display system 112 is a touch-sensitive surface that accepts input from the user based on haptic and/or tactile contact. The display system 112 and the display controller 156 (along with any associated modules and/or sets of instructions in memory 102) detect contact (and any movement or breaking of the contact) on the display system 112 and converts the detected contact into interaction with user-interface objects (e.g., one or more soft keys, icons, web pages or images) that are displayed on the touch screen. In an exemplary embodiment, a point of contact between a touch screen in the display system 112 and the user corresponds to a finger of the user.

The touch screen in the display system 112 may use LCD (liquid crystal display) technology, or LPD (light emitting polymer display) technology, although other display technologies may be used in other embodiments. The touch screen in the display system 112 and the display controller 156 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with a touch screen in the display system 112. A touch-sensitive display in some embodiments of the display system 112 may be analogous to the multi-touch sensitive tablets described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1. However, a touch screen in the display system 112 displays visual output from the portable device 100, whereas touch sensitive tablets do not provide visual output. The touch screen in the display system 112 may have a resolution in excess of 100 dpi. In an exemplary embodiment, the touch screen in the display system has a resolution of approximately 168 dpi. The user may make contact with the touch screen in the display system 112 using any suitable object or appendage, such as a stylus, a finger, and so forth. In some embodiments, the user interface is designed to work primarily with finger-based contacts and gestures, which are much less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, the device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from the touch screen in the display system 112 or an extension of the touch-sensitive surface formed by the touch screen.

In some embodiments, the device 100 may include a physical or virtual click wheel as an input control device 116. A user may navigate among and interact with one or more graphical objects (henceforth referred to as icons) displayed in the display system 112 by rotating the click wheel or by moving a point of contact with the click wheel (e.g., where the amount of movement of the point of contact is measured by its angular displacement with respect to a center point of the click wheel). The click wheel may also be used to select one or more of the displayed icons. For example, the user may press down on at least a portion of the click wheel or an associated button. User commands and navigation commands provided by the user via the click wheel may be processed by an input controller 160 as well as one or more of the modules and/or sets of instructions in memory 102. For a virtual click wheel, the click wheel and click wheel controller may be part of the display system 112 and the display controller 156, respectively. For a virtual click wheel, the click wheel may be either an opaque or semitransparent object that appears and disappears on the touch screen display in response to user interaction with the device. In some embodiments, a virtual click wheel is displayed on the touch screen of a portable multifunction device and operated by user contact with the touch screen.

The device 100 also includes a power system 162 for powering the various components. The power system 162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

The device 100 may also include one or more optical sensors 164. FIG. 1 shows an optical sensor coupled to an optical sensor controller 158 in I/O subsystem 106. The optical sensor 164 may include charge-coupled device (CCD) or complementary metal-oxide semiconductor (CMOS) phototransistors. The optical sensor 164 receives light from the environment, projected through one or more lens, and converts the light to data representing an image. In conjunction with an imaging module 143, the optical sensor 164 may capture still images or video. In some embodiments, an optical sensor is located on the back of the device 100, opposite the touch screen display 112 on the front of the device, so that the touch screen display may be used as a viewfinder for either still and/or video image acquisition. In some embodiments, an optical sensor is located on the front of the device so that the user's image may be obtained for videoconferencing while the user views the other video conference participants on the touch screen display. In some embodiments, the position of the optical sensor 164 can be changed by the user (e.g., by rotating the lens and the sensor in the device housing) so that a single optical sensor 164 may be used along with the touch screen display for both video conferencing and still and/or video image acquisition.

The device 100 may also include one or more proximity sensors 166.

In some embodiments, the software components stored in memory 102 may include an operating system 126, a communication module (or set of instructions) 128, a contact/motion module (or set of instructions) 130, a graphics module (or set of instructions) 132, a text input module (or set of instructions) 134, a Global Positioning System (GPS) module (or set of instructions) 135, and applications (or set of instructions) 136.

The operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

The communication module 128 facilitates communication with other devices over one or more external ports 124 and also includes various software components for handling data received by the RF circuitry 108 and/or the external port 124. The external port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Computer, Inc.) devices.

The contact/motion module 130 may detect contact with the touch screen in the display system 112 (in conjunction with the display controller 156) and other touch sensitive devices (e.g., a touchpad or physical click wheel). The contact/motion module 130 includes various software components for performing various operations related to detection of contact, such as determining if contact has occurred, determining if there is movement of the contact and tracking the movement across the touch screen in the display system 112, and determining if the contact has been broken (i.e., if the contact has ceased). Determining movement of the point of contact may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, the contact/motion module 130 and the display controller 156 also detects contact on a touchpad. In some embodiments, the contact/motion module 130 detects movement of one or more objects on or near the touch screen and/or the touchpad. In some embodiments, the contact/motion module 130 and the controller 160 detects contact on a click wheel 116.

The graphics module 132 includes various known software components for rendering and displaying graphics on the display system 112, including components for changing the intensity of graphics that are displayed. As used herein, the term "graphics" includes any object that can be displayed to a user, including without limitation text, web pages, icons (such as user-interface objects including soft keys), digital images, videos, animations and the like.

The text input module 134, which may be a component of graphics module 132, provides soft keyboards for entering text in various applications (e.g., contacts 137, e-mail 140, IM 141, blogging 142, browser 147, and any other application that needs text input).

The GPS module 135 determines the location of the device and provides this information for use in various applications (e.g., to telephone 138 for use in location-based dialing, to camera 143 and/or blogger 142 as picture/video metadata, and to applications that provide location-based services such as weather widgets, local yellow page widgets, and map/navigation widgets).

The applications 136 may include the following modules (or sets of instructions), or a subset or superset thereof:
  a contacts module 137 (sometimes called an address book or contact list);
  a telephone module 138;
  a video conferencing module 139;
  an e-mail client module 140;
  an instant messaging (IM) module 141;
  a blogging module 142;
  a camera module 143 for still and/or video images;
  an image management module 144;
  a video player module 145;
  a music player module 146;
  a browser module 147;
  a calendar module 148;
  widget modules 149, which may include weather widget 149-1,
  stocks widget 149-2,
  calculator widget 149-3,
  alarm clock widget 149-4,
  dictionary widget 149-5, and other widgets obtained by the user, as well as user-created widgets 149-6;
  widget creator module 150 for making user-created widgets 149-6; and/or
  search module 151.

Examples of other applications 136 that may be stored in memory 102 include memo pad and other word processing applications, JAVA-enabled applications, encryption, digital rights management, voice recognition, and voice replication.

In conjunction with display system 112, display controller 156, contact module 130, graphics module 132, and text input module 134, the contacts module 137 may be used to manage an address book or contact list, including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth.

In conjunction with RF circuitry 108, audio circuitry 110, speaker 111, microphone 113, display system 112, display controller 156, contact module 130, graphics module 132, and text input module 134, the telephone module 138 may be used to enter a sequence of characters corresponding to a telephone number, access one or more telephone numbers in the address book 137, modify a telephone number that has been entered, dial a respective telephone number, conduct a conversation and disconnect or hang up when the conversation is completed. As noted above, the wireless communication may use any of a plurality of communications standards, protocols and technologies.

In conjunction with RF circuitry 108, audio circuitry 110, speaker 111, microphone 113, display system 112, display controller 156, optical sensor 164, optical sensor controller 158, contact module 130, graphics module 132, text input module 134, contact list 137, and telephone module 138, the videoconferencing module 139 may be used to initiate, conduct, and terminate a video conference between a user and one or more other participants.

In conjunction with RF circuitry 108, display system 112, display controller 156, contact module 130, graphics module 132, and text input module 134, the e-mail client module 140 may be used to create, send, receive, and manage e-mail. In conjunction with image management module 144, the e-mail module 140 makes it very easy to create and send e-mails with still or video images taken with camera module 143.

In conjunction with RF circuitry 108, display system 112, display controller 156, contact module 130, graphics module 132, and text input module 134, the instant messaging module 141 may be used to enter a sequence of characters corresponding to an instant message, to modify previously entered characters, to transmit a respective instant message (for example, using a Short Message Service (SMS) or Multimedia Message Service (MMS) protocol), to receive instant messages and to view received instant messages. In some embodiments, transmitted and/or received instant messages may include graphics, photos, audio files, video files and/or other attachments as are supported in a MMS and/or an Enhanced Messaging Service (EMS).

In conjunction with RF circuitry 108, display system 112, display system controller 156, contact module 130, graphics module 132, and text input module 134, the browser module 147 may be used to browse the Internet, including searching, linking to, receiving, and displaying web pages or portions thereof, as well as attachments and other files linked to web pages.

In conjunction with RF circuitry 108, display system 112, display system controller 156, contact module 130, graphics module 132, text input module 134, and browser module 147, the widget modules 149 are mini-applications that may be downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, display system 112, display system controller 156, contact module 130, graphics module 132, text input module 134, and browser module 147, the widget creator module 150 may be used by a user to create widgets (e.g., turning a user-specified portion of a web page into a widget).

In conjunction with display system 112, display system controller 156, contact module 130, graphics module 132, and text input module 134, the search module 151 may be used to search for text, music, sound, image, video, and/or other files in memory 102 that match one or more search criteria (e.g., one or more user-specified search terms).

Each of the above identified modules and applications correspond to a set of instructions for performing one or more functions described above. These modules (i.e., sets of instructions) need not be implemented as separate software programs, procedures or modules, and thus various subsets of these modules may be combined or otherwise re-arranged in various embodiments. In some embodiments, memory 102 may store a subset of the modules and data structures identified above. Furthermore, memory 102 may store additional modules and data structures not described above.

In some embodiments, the device 100 is a device where operation of a predefined set of functions on the device is performed exclusively through a touch screen in the display system 112 and/or a touchpad. By using a touch screen and/or a touchpad as the primary input/control device for operation of the device 100, the number of physical input/control devices (such as push buttons, dials, and the like) on the device 100 may be reduced.

The predefined set of functions that may be performed exclusively through a touch screen and/or a touchpad includes navigation between user interfaces. In some embodiments, the touchpad, when touched by the user, navigates the device 100 to a main, home, or root menu from any user interface that may be displayed on the device 100. In such embodiments, the touchpad may be referred to as a "menu button." In some other embodiments, the menu button may be a physical push button or other physical input/control device instead of a touchpad.

Modifications and improvements to the invention will be readily apparent to those skilled in the art. Such modifications and improvements are intended to be within the scope of this invention.

The invention claimed is:

1. A method of facilitating a postponed purchase of an item to a user, the method including:
    receiving, by a mobile computer processing device, at least one data set relating to an item for sale based on a selection of the item;
    representing at least one of the data sets on a display of the mobile computer processing device;
    storing the at least one data set relating to the item in a wish list;
    in response to the mobile computer processing device entering a geo-fence covering a predetermined area around a retail store:
        receiving, by the mobile computer processing device from a beacon, a wireless signal comprising a beacon identification number when the mobile computer processing device is in a proximity zone of the beacon;
        determining a location of the mobile computer processing device based on the beacon identification number;
        assessing a distance between a location of a physical item for sale associated with the at least one data set and the location of the mobile computer processing device, wherein the data set includes at least one Stock Keeping Unit (SKU) data item and includes data selected from the group consisting of: image data, price data, colour data, size data and category data; and
        notifying the user of the distance to the physical item;
    checking offline purchases of the item on the wish list made at the retail store after receiving the at least one data set relating to the item for sale, to identify a likely or actual purchase made by the user; and
    attributing an offline purchase of the item to the user by verifying that a location of the offline purchase at a time of the offline purchase matches the location of the mobile computer processing device at the time of the offline purchase.

2. The method in accordance with claim 1, further comprising creating a user account for the user on the mobile computer processing device.

3. The method in accordance with claim 2, further comprising recording one or more bank account details for the user and associating them with the user account in the form of one or more digital tokens.

4. The method in accordance with claim 1, further comprising recording a notification made to the mobile computer processing device regarding the distance between the location of the physical item and the location of the mobile computer processing device.

5. The method in accordance with claim 4, further comprising billing the vendor a selected amount after attributing the offline purchase of the item to the user.

6. The method in accordance with claim 5, wherein the offline purchase is made by the user using bank account details of the user.

7. The method in accordance with claim 1, further comprising receiving, by the mobile computer processing device, a discount or promotional advertisement when the mobile computer processing device is in a proximity zone of the beacon.

8. The method in accordance with claim 1, wherein the beacon only broadcasts the wireless signal during a predetermined time of day.

9. A method of facilitating a postponed purchase of a vendor's item to a user, the method including:
receiving, by a mobile computer processing device, at least one Stock Keeping Unit (SKU) data item set regarding the vendor's item from computer processing system of the vendor;
displaying the at least one SKU data item set on a display of the mobile computer processing device;
in response to the mobile computer processing device entering a geo-fence covering a predetermined area around a retail store:
receiving, by the mobile computer processing device from a beacon, a wireless signal comprising a beacon identification number when the mobile computer processing device is in a proximity zone of the beacon;
determining a location of the mobile computer processing device based on the beacon identification number; and
assessing a distance between a location of a physical item associated with the at least one data item sets and the location of the mobile computer processing device;
checking offline purchases of the item on the wish list made at the retail store after receiving the at least one SKU data item set, to identify a likely or actual purchase made by the user; and
attributing an offline purchase of the item to the user by verifying that a location of the offline purchase at a time of the offline purchase matches the location of the mobile computer processing device at the time of the offline purchase.

10. The method in accordance with claim 9, further comprising requesting delivery of the item to the user.

11. The method in accordance with claim 9, further comprising creating a user account for the user on the mobile computer processing device.

12. The method in accordance with claim 11, further comprising recording one or more bank account details for the user and associating them with the user account in the form of one or more digital tokens.

13. The method in accordance with claim 9, comprising recording a notification made to the mobile computer processing device regarding the distance between the location of the physical item and the location of the mobile computer processing device.

14. The method in accordance with claim 9, further comprising receiving, by the mobile computer processing device, a discount or promotional advertisement when the mobile computer processing device is in a proximity zone of the beacon.

15. The method in accordance with claim 9, wherein the beacon only broadcasts the wireless signal during a predetermined time of day.

16. A mobile computer processing device, comprising:
a memory configured to store instructions; and
a processor coupled to the memory and configured to execute the instructions, which cause the processor to:
receive at least one Stock Keeping Unit (SKU) data item set regarding a vendor's item from computer processing system of the vendor;
display the at least one SKU data item set on a display of the mobile computer processing device;
in response to the mobile computer processing device entering a geo-fence covering a predetermined area around a retail store:
receive, from a beacon, a wireless signal comprising a beacon identification number when the mobile computer processing device is in a proximity zone of the beacon;
determine a location of the mobile computer processing device based on the beacon identification number; and
assess a distance between a location of a physical item associated with the at least one data item sets and the location of the mobile computer processing device;
check offline purchases of the item on the wish list made at the retail store after receiving the at least one SKU data item set, to identify a likely or actual purchase made by the user; and
attribute an offline purchase of the item to the user by verifying that a location of the offline purchase at a time of the offline purchase matches the location of the mobile computer processing device at the time of the offline purchase.

17. The mobile computer processing device in accordance with claim 16, wherein the instructions further cause the processor to create a user account for the user on the mobile computer processing device.

18. The mobile computer processing device in accordance with claim 17, wherein the instructions further cause the processor to record one or more bank account details for the user and associating them with the user account in the form of one or more digital tokens.

19. The mobile computer processing device in accordance with claim 16, wherein the instructions further cause the processor to receive a discount or promotional advertisement when the mobile computer processing device is in a proximity zone of the beacon.

20. The mobile computer processing device in accordance with claim 16, wherein the beacon only broadcasts the wireless signals during a predetermined time of day.

* * * * *